US012596749B1

(12) United States Patent
Schilders

(10) Patent No.: US 12,596,749 B1
(45) Date of Patent: Apr. 7, 2026

(54) GRAPH-BASED MODELS WITH BI-DIRECTIONAL NODES

(71) Applicants:Infosys Limited, Bangalore (IN);
InvertIT Inc., Columbus, IN (US)

(72) Inventor: Steven Schilders, Columbus, IN (US)

(73) Assignees: Infosys Limited, Bangalore (IN);
InvertIT Inc., Columbus, IN (US)

( * ) Notice: Subject to any disclaimer, the term of this patent is extended or adjusted under 35 U.S.C. 154(b) by 0 days.

(21) Appl. No.: 19/040,411

(22) Filed: Jan. 29, 2025

(51) Int. Cl.
G06F 16/901 (2019.01)

(52) U.S. Cl.
CPC ................................. G06F 16/9024 (2019.01)

(58) Field of Classification Search
CPC .................................................... G06F 16/9024
See application file for complete search history.

(56) References Cited

U.S. PATENT DOCUMENTS

| | | | | |
|---|---|---|---|---|
| 9,116,975 | B2 * | 8/2015 | Shankar | G06F 16/248 |
| 11,166,061 | B2 * | 11/2021 | Rajendran | G06F 16/735 |
| 12,056,190 | B1 | 8/2024 | Schilders | |
| 12,164,569 | B2 | 12/2024 | Schilders | |
| 12,216,652 | B2 * | 2/2025 | Schilders | G06F 16/24526 |
| 12,222,986 | B2 | 2/2025 | Schilders | |
| 12,229,191 | B2 | 2/2025 | Schilders | |
| 12,386,898 | B2 * | 8/2025 | Schilders | G06F 16/245 |
| 12,447,608 | B2 * | 10/2025 | Cristache | B25J 9/163 |
| 2024/0256369 | A1 | 8/2024 | Schilders | |
| 2024/0256602 | A1 * | 8/2024 | Schilders | G06F 16/24568 |
| 2024/0256603 | A1 | 8/2024 | Schilders | |
| 2024/0257417 | A1 | 8/2024 | Schilders | |
| 2024/0288841 | A1 | 8/2024 | Schilders | |
| 2024/0289311 | A1 | 8/2024 | Schilders | |
| 2024/0289315 | A1 * | 8/2024 | Schilders | G06F 16/2264 |
| 2024/0289327 | A1 * | 8/2024 | Schilders | G06F 16/24526 |
| 2024/0289390 | A1 | 8/2024 | Schilders | |
| 2024/0289393 | A1 * | 8/2024 | Schilders | G16H 10/60 |
| 2024/0289483 | A1 * | 8/2024 | Schilders | G06F 21/6227 |
| 2024/0289484 | A1 * | 8/2024 | Schilders | G06F 16/9024 |
| 2024/0291774 | A1 * | 8/2024 | Schilders | H04L 47/83 |
| 2024/0296185 | A1 | 9/2024 | Schilders | |
| 2025/0156478 | A1 * | 5/2025 | Parnell | G06F 16/9024 |
| 2025/0307596 | A1 * | 10/2025 | Schilders | G06N 3/04 |

* cited by examiner

*Primary Examiner* — Jorge A Casanova
(74) *Attorney, Agent, or Firm* — Finnegan, Henderson, Farabow, Garrett & Dunner, LLP

(57) ABSTRACT

An overlay system is provided that includes a storage element and processing circuitry coupled thereto. The storage element stores an executable graph-based model having various bi-directional nodes and connection links. The processing circuitry is configured to receive a stimulus and identify, based on the stimulus, a first bi-directional node in the executable graph-based model. The processing circuitry is further configured to determine, coupled to the first bi-directional node, a first connection link that includes an outward connection object defining association with the first bi-directional node and an inward connection object defining association with a second bi-directional node. The processing circuitry is further configured to identify, based on the first connection link, the second bi-directional node and execute an operation associated with the stimulus based on at least one of the first bi-directional node, the second bi-directional node, or the first connection link.

20 Claims, 16 Drawing Sheets

300B

400B

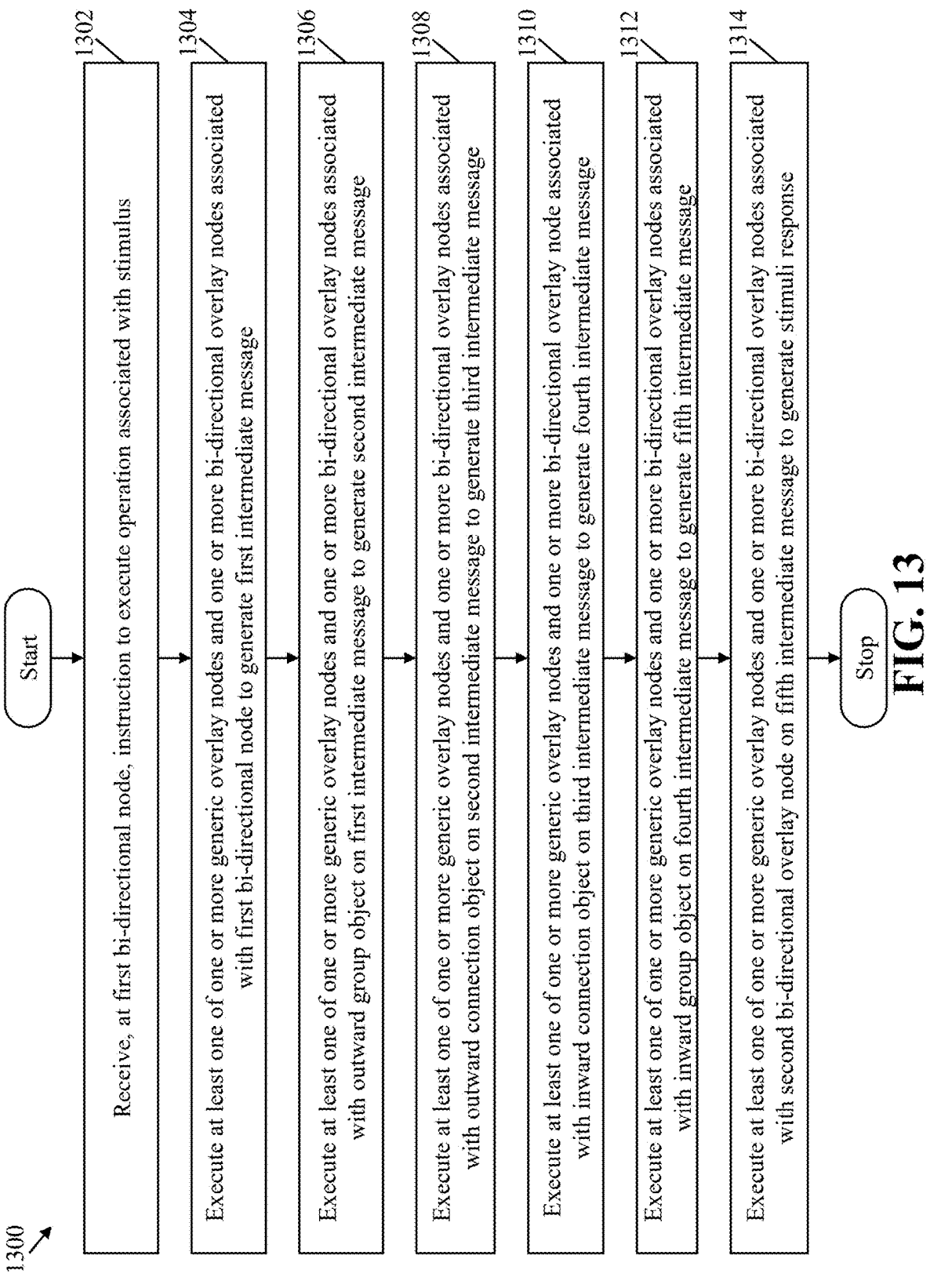

1300

Start

1302 — Receive, at first bi-directional node, instruction to execute operation associated with stimulus 1304 — Execute at least one of one or more generic overlay nodes and one or more bi-directional overlay nodes associated with first bi-directional node to generate first intermediate message 1306 — Execute at least one of one or more generic overlay nodes and one or more bi-directional overlay nodes associated with outward group object on first intermediate message to generate second intermediate message 1308 — Execute at least one of one or more generic overlay nodes and one or more bi-directional overlay nodes associated with outward connection object on second intermediate message to generate third intermediate message 1310 — Execute at least one of one or more generic overlay nodes and one or more bi-directional overlay node associated with inward connection object on third intermediate message to generate fourth intermediate message 1312 — Execute at least one of one or more generic overlay nodes and one or more bi-directional overlay nodes associated with inward group object on fourth intermediate message to generate fifth intermediate message 1314 — Execute at least one of one or more generic overlay nodes and one or more bi-directional overlay nodes associated with second bi-directional overlay node on fifth intermediate message to generate stimuli response Stop

FIG. 13

GRAPH-BASED MODELS WITH BI-DIRECTIONAL NODES

FIELD OF THE DISCLOSURE

Various embodiments of the present disclosure relate generally to graph-based models. More specifically, various embodiments of the present disclosure relate to executable graph-based models with bi-directional nodes.

BACKGROUND

Graph-based models are widely used in various domains, including artificial intelligence, database management, and so on. These models consist of nodes such as vertices and edges, where vertices represent real-world entities and edges depict the relationships between these entities. In a typical graph-based model, a vertex (or node) is connected to another vertex by way of an edge, with the edge indicating a role or relationship between the vertices.

When utilizing a graph-based model, a first node is loaded into the graph-based model based on its requirement. This process involves executing a lookup operation to identify other nodes connected to the first node, which may also be required to be loaded into the graph-based model. Consequently, the first node and all its associated nodes are loaded into the graph-based model. However, this approach presents several challenges. The need to perform lookup operations to identify connected nodes can be time-consuming and resource-intensive, leading to increased costs and execution time. In real-world scenarios, especially when a large number of nodes are interconnected, this can result in significant latency, which negatively impacts the overall performance of an associated system.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating bi-directional nodes in executable graph-based models are provided substantially as shown in, and described in connection with, at least one of the figures.

The methods and systems described herein provide an overlay system. The overlay system includes processing circuitry and a storage element coupled to the processing circuitry. The storage element is configured to store an executable graph-based model that includes a plurality of bi-directional nodes and a plurality of connection links. The processing circuitry is configured to receive a stimulus. The processing circuitry is further configured to identify, based on the stimulus, a first bi-directional node from the plurality of bi-directional nodes. The processing circuitry is further configured to determine a first connection link, of the plurality of connection links, coupled to the first bi-directional node. The first connection link may include a first outward connection object defining association with the first bi-directional node and a first inward connection object defining association with a second bi-directional node of the plurality of bi-directional nodes. The processing circuitry is further configured to identify, based on the first connection link, the second bi-directional node. The processing circuitry is further configured to execute an operation associated with the stimulus based on at least one of the first bi-directional node, the second bi-directional node, or the first connection link.

In some embodiments, the first outward connection object and the first inward connection object have a primary role and a secondary role, respectively. The primary role and the secondary role, collectively, indicate a capacity in which the first bi-directional node and the second bi-directional node are mutually associated. The operation associated with the stimulus is executed in conformity with the primary role and the secondary role.

In some embodiments, the primary role and the secondary role are complementary.

In some embodiments, the executable graph-based model further includes a plurality of bi-directional overlay nodes. The processing circuitry is further configured to identify a first set of bi-directional overlay nodes, of the plurality of bi-directional nodes, that is associated with the first bi-directional node. The first set of bi-directional overlay nodes is configured to extend functionality of the first bi-directional node. The operation associated with the stimulus is executed further based on the first set of bi-directional overlay nodes.

In some embodiments, the executable graph-based model further includes a plurality of generic overlay nodes. The processing circuitry is further configured to identify a first set of generic overlay nodes, of the plurality of generic overlay nodes, that is associated with the first bi-directional node. The first set of generic overlay nodes is configured to extend functionality of the first bi-directional node. The first bi-directional node includes an overlay manager that is configured to maintain a ledger of functionalities of the first set of generic overlay nodes and the first set of bi-directional overlay nodes. The overlay manager is further configured to trigger, based on the stimulus, at least one of a group consisting of (i) one or more generic overlay nodes of the first set of generic overlay nodes or (ii) one or more bi-directional overlay nodes of the first set of bi-directional overlay nodes. The operation associated with the stimulus is executed further based on the one or more generic overlay nodes and the one or more bi-directional overlay nodes.

In some embodiments, the first set of bi-directional overlay nodes is associated with the first bi-directional node by way of one of a group consisting of a direct association and a second connection link of the plurality of connection links.

In some embodiments, a bi-directional overlay node, of the first set of bi-directional overlay nodes, is one of a group consisting of a stateless node and a stateful node.

In some embodiments, the executable graph-based model further includes a plurality of bi-directional overlay nodes. The processing circuitry is further configured to identify a second set of bi-directional overlay nodes, of the plurality of bi-directional overlay nodes, that is associated with the second bi-directional node. The second set of bi-directional overlay nodes is configured to extend functionality of the second bi-directional node. The operation associated with the stimulus is executed further based on the second set of bi-directional overlay nodes.

In some embodiments, the executable graph-based model further includes a plurality of bi-directional overlay nodes. The processing circuitry is further configured to identify a third set of bi-directional overlay nodes, of the plurality of bi-directional overlay nodes, that is associated with the first outward connection object. The third set of bi-directional overlay nodes is configured to extend functionality of the first outward connection object. The operation associated with the stimulus is executed further based on the third set of bi-directional overlay nodes.

In some embodiments, the executable graph-based model further includes a plurality of bi-directional overlay nodes. The processing circuitry is further configured to identify a fourth set of bi-directional overlay nodes, of the plurality of bi-directional overlay nodes, that is associated with the first inward connection object. The fourth set of bi-directional overlay nodes is configured to extend functionality of the first inward connection object. The operation associated with the stimulus is executed further based on the fourth set of bi-directional overlay nodes.

In some embodiments, a node-type of a bi-directional node of the plurality of bi-directional nodes is an edge node-type.

In some embodiments, the processing circuitry is further configured to (i) determine a third connection link, of the plurality of connection links, coupled to the first bi-directional node, the third connection link including a second outward connection object defining association with the first bi-directional node and a second inward connection object defining association with a third bi-directional node of the plurality of bi-directional nodes, and (ii) identify, based on the third connection link, the third bi-directional node. The first outward connection object and the second outward connection object constitute an outward group object associated with the first bi-directional node. The operation associated with the stimulus is executed further based on the outward group object, the third bi-directional node, and the third connection link.

In some embodiments, the operation associated with the stimulus is executed further based on the first bi-directional node communicating with the second bi-directional node and the third bi-directional node by way of the outward group object.

In some embodiments, the executable graph-based model further includes a plurality of bi-directional overlay nodes. The processing circuitry is further configured to identify a fifth set of bi-directional overlay nodes, of the plurality of bi-directional overlay nodes, that is associated with the outward group object. The fifth set of bi-directional overlay nodes is configured to extend functionality of the outward group object. The operation associated with the stimulus is executed further based on the fifth set of bi-directional overlay nodes.

In some embodiments, the executable graph-based model further includes a plurality of generic overlay nodes. The processing circuitry is further configured to identify a second set of generic overlay nodes, of the plurality of generic overlay nodes, that is associated with the outward group object. The second set of generic overlay nodes is configured to extend functionality of the outward group object. The operation associated with the stimulus is executed further based on the second set of generic overlay nodes.

In some embodiments, the processing circuitry is further configured to (i) determine a fourth connection link, of the plurality of connection links, coupled to the first bi-directional node, the fourth connection link including a third inward connection object defining association with the first bi-directional node and a third outward connection object defining association with a fourth bi-directional node of the plurality of bi-directional nodes, and (ii) identify, based on the fourth connection link, the fourth bi-directional node. The processing circuitry is further configured to (i) determine a fifth connection link, of the plurality of connection links, coupled to the first bi-directional node, the fifth connection link including a fourth inward connection object defining association with the first bi-directional node and a fourth outward connection object defining association with a fifth bi-directional node of the plurality of bi-directional nodes, and (ii) identify, based on the fifth connection link, the fifth bi-directional node. The third inward connection object and the fourth inward connection object constitute an inward group object associated with the first bi-directional node. The operation associated with the stimulus is executed further based on the inward group object, the fourth bi-directional node, the fifth bi-directional node, the fourth connection link, and the fifth connection link.

In some embodiments, the operation associated with the stimulus is executed further based on the first bi-directional node communicating with the fourth bi-directional node and the fifth bi-directional node by way of the inward group object.

In some embodiments, the executable graph-based model further includes a plurality of bi-directional overlay nodes. The processing circuitry is further configured to identify a sixth set of bi-directional overlay nodes, of the plurality of bi-directional overlay nodes, that is associated with the inward group object. The sixth set of bi-directional overlay nodes is configured to extend functionality of the inward group object. The operation associated with the stimulus is executed further based on the sixth set of bi-directional overlay nodes.

In some embodiments, the executable graph-based model further includes a plurality of generic overlay nodes. The processing circuitry is further configured to identify a third set of generic overlay nodes, of the plurality of generic overlay nodes, that is associated with the inward group object. The third set of generic overlay nodes is configured to extend functionality of the inward group object. The operation associated with the stimulus is executed further based on the third set of generic overlay nodes.

In some embodiments, the first connection link is a bi-directional node with a role node-type.

In some embodiments, the first connection link is indicative of a dependency between the first bi-directional node and the second bi-directional node. The dependency between the first bi-directional node and the second bi-directional node is one of a group consisting of: an own-owned dependency, a use-used dependency, or a share-shared dependency.

In some embodiments, based on the dependency being the own-owned dependency, the first bi-directional node owns the second bi-directional node.

In some embodiments, based on the dependency being the share-shared dependency, the first bi-directional node shares the second bi-directional node with one or more bi-directional nodes of the plurality of bi-directional nodes.

In some embodiments, based on the dependency being the use-used dependency, the first bi-directional node uses the second bi-directional node based on an absence of simultaneous use of the second bi-directional node by one or more other bi-directional nodes of the plurality of bi-directional nodes.

In some embodiments, at least one of the first inward connection object and the first outward connection object is associated with a set of attributes pertaining to a loading strategy associated with at least one of the group consisting of the first bi-directional node or the second bi-directional node.

In some embodiments, prior to the execution of the operation associated with the stimulus, the processing circuitry is further configured to load, in the executable graph-based model, at least one of a group consisting of: the first bi-directional node, the second bi-directional node, or the first connection link.

In some embodiments, prior to the execution of the operation associated with the stimulus, the processing circuitry is further configured to load, in the executable graph-based model, one or more sets of bi-directional overlay nodes that are associated with at least one of a group consisting of: the first bi-directional node, the second bi-directional node, the first inward connection object, or the first outward connection object.

In some embodiments, prior to the execution of the operation associated with the stimulus, the processing circuitry is further configured to load, in the executable graph-based model, one or more sets of generic overlay nodes that are associated with at least one of a group consisting of: the first bi-directional node, the second bi-directional node, the first inward connection object, or the first outward connection object.

In some embodiments, based on the loading of the first bi-directional node, the processing circuitry is further configured to load at least one of a group consisting of (i) one or more bi-directional nodes of the plurality of bi-directional nodes and (ii) one or more generic nodes of the executable graph-based model, with which the first bi-directional node has a dependency. The dependency is one of a group consisting of: an own-owned dependency, a share-shared dependency, and a use-used dependency.

In some embodiments, the first bi-directional node is further configured to inherit at least one of a group consisting of (i) a sixth bi-directional node of the plurality of bi-directional nodes or (ii) one or more generic nodes of the executable graph-based model. Based on the loading of the first bi-directional node, the processing circuitry is further configured to load at least one of the group consisting of (i) the sixth bi-directional node or (ii) the one or more generic nodes.

In some embodiments, upon the execution of the operation associated with the stimulus, the processing circuitry is further configured to unload at least one of a group consisting of: the first bi-directional node, the second bi-directional node, or the first connection link, from the executable graph-based model.

In some embodiments, based on the unloading of the first bi-directional node, the processing circuitry is further configured to unload at least one of a group consisting of (i) one or more bi-directional nodes of the plurality of bi-directional nodes or (ii) one or more generic nodes of the executable graph-based model, with which the first bi-directional node has a dependency. The dependency is one of a group consisting of: an own-owned dependency, a share-shared dependency, or a use-used dependency.

In some embodiments, the first set of bi-directional nodes is further configured to inherit at least one of a group consisting of (i) a seventh bi-directional node of the plurality of bi-directional nodes or (ii) one or more generic nodes of the executable graph-based model. Based on the unloading of the first bi-directional overlay node, the processing circuitry is further configured to unload at least one of the group consisting of (i) the seventh bi-directional node or (ii) the one or more generic nodes.

In some embodiments, the executable graph-based model further includes a plurality of generic nodes. A node-type of each generic node of the plurality of generic nodes is one of a group consisting of: a vertex node-type, an edge node-type, a role node-type, or an overlay node-type. The processing circuitry is further configured to identify a first generic node of the plurality of generic nodes that is associated with the first bi-directional node. The first bi-directional node is associated with the first generic node by way of a first generic role that indicates a capacity in which the first bi-directional node is associated with the first generic node. The operation associated with the stimulus is executed further based on the first generic node and the first generic role.

In some embodiments, the processing circuitry is further configured to (i) determine a sixth connection link, of the plurality of connection links, coupled to the second bi-directional node, the sixth connection link including the first inward connection object defining association with the second bi-directional node and a fifth outward connection object defining association with an eighth bi-directional node of the plurality of bi-directional nodes, and (ii) identify, based on the sixth connection link, the eighth bi-directional node. The operation associated with the stimulus is executed further based on the eighth bi-directional node and the sixth connection link.

In some embodiments, a method is disclosed. The method comprises receiving, by processing circuitry of an overlay system, a stimulus. An executable graph-based model is stored in a storage element of the overlay system. The executable graph-based model includes a plurality of bi-directional nodes and a plurality of connection links. The method further comprises identifying, by the processing circuitry, based on the stimulus, a first bi-directional node from the plurality of bi-directional nodes, and determining, by the processing circuitry, a first connection link, of the plurality of connection links, coupled to the first bi-directional node. The first connection link includes a first outward connection object defining association with the first bi-directional node and a first inward connection object defining association with a second bi-directional node of the plurality of bi-directional nodes. The method further comprises identifying, by the processing circuitry, based on the first connection link, the second bi-directional node. Further, the method comprises executing, by the processing circuitry, an operation associated with the stimulus based on at least one of the first bi-directional node, the second bi-directional node, or the first connection link.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 13 illustrates a flowchart of a method for execution of an operation associated with the stimulus, consistent with disclosed embodiments of the present disclosure.

DETAILED DESCRIPTION

Figure 1:
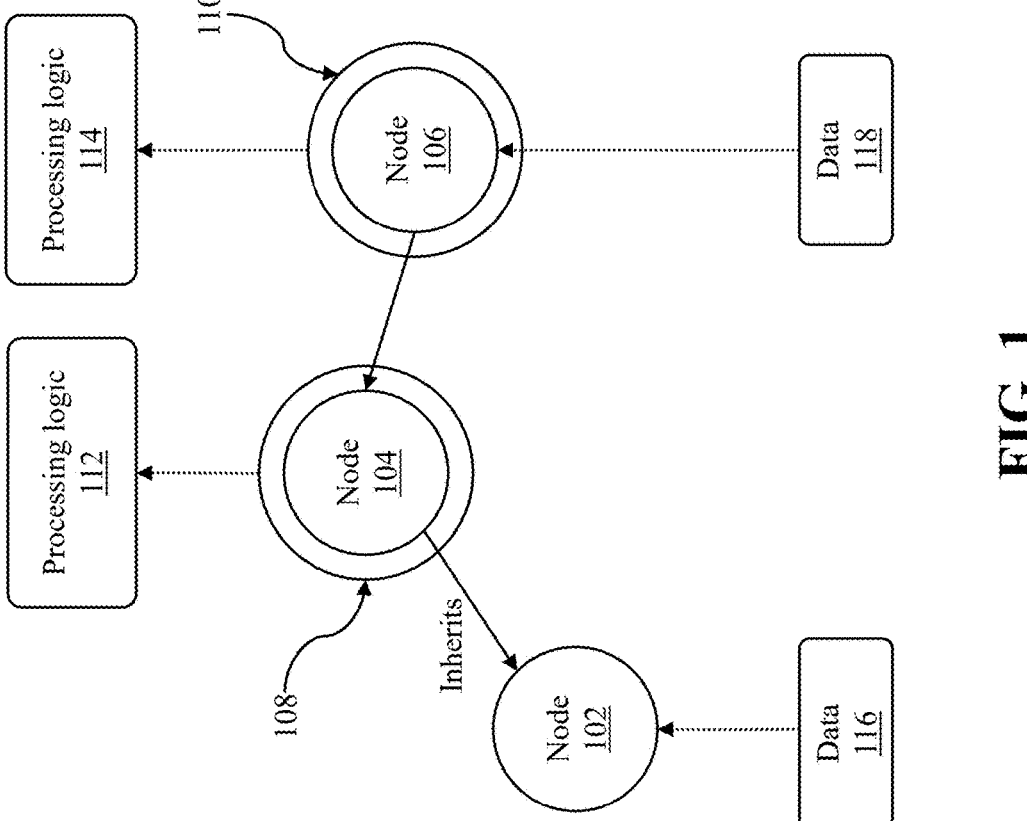
FIG. 1 is a graph that illustrates a composition of an executable graph-based model, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

With exponential growth in the field of computing, graph-based models have found their application in numerous domains leading to various technologies being implemented using the graph-based models. A technology that is implemented by way of a graph-based model has each unit associated therewith realized as a node of the graph-based model. Such use of the graph-based model enables complete control over even the smallest unit of the technology. Data and processing logic associated with the technology are stored in the graph-based model in form of nodes. This allows for the data and processing logic to be used by accessing relevant nodes. While using a node of the graph-based model, nodes that are associated with the initial node may also be required to be used. In addition, for the initial node to be used, the initial node is required to be loaded in the graph-based model. While loading the initial node, a look-up operation may be performed to determine association of the initial node with the other nodes. Subsequently, based on the identification of the association with the initial node, the associated nodes are also loaded along with the initial node. For example, a first vertex is associated with a second vertex by way of an edge node that includes a role indicative of a capacity in which the first node is associated with the second node. For optimized use of resources, the first and second nodes may be unloaded from the graph-based model when not used for a specific time duration. In an instance, the first node may be required to perform one or more operations associated with the graph-based model. In such an instance, the first node may be loaded in the graph-based model. Additionally, based on association with the first node, the second node may also be required to be loaded in the graph-based model.

Therefore, a look-up operation, in the graph-based model or an edge table associated with the graph-based model, may be performed to determine one or more nodes (for example, the second node) associated with the first node. Subsequently, based on the determined association with the first node, the second node and the edge node may be loaded in the graph-based model. The execution of the lookup operation to identify the associated nodes may be time-consuming and resource-intensive, leading to increased costs and execution time. In real-world scenarios, especially when a large number of nodes are interconnected, this can result in significant latency. Further, the associations among the large number of nodes may also require an equally large number of edge nodes to be instantiated in the graph-based model. Such edge nodes may also be required to be identified and loaded in order to determine the association among the nodes, which further complicates loading of the node and the associated nodes.

The present disclosure is directed to facilitation of bi-directional nodes in an executable graph-based model of an overlay system. The executable graph-based model is a customized hypergraph with hyper-edges that are realized by way of executable nodes. The realization of a node refers to an instantiation of the node in the executable graph-based model and actuating one or more operations associated with the node in the overlay system. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features in the overlay system. Each overlay node is associated with one or more nodes (for example, a vertex node, an edge node, or the like) of the executable graph-based model and includes a corresponding processing logic that when executed implements a functionality thereof on the associated nodes. Hence, the processing logic is implemented within the executable graph-based model and is not required to be retrieved from any external system.

The overlay system disclosed herein facilitates bi-directional nodes in the executable graph-based model. A bi-directional node is realized by way of a hyper-edge in the executable graph-based model. Each bi-directional node being a hyper-edge includes a role by way of which it may be associated with another bi-directional node. A first bi-directional node may be associated with another bi-directional node by way of a connection link that includes an outward connection object and an inward connection object. The outward connection object may be indicative of a primary role associated with the first bi-directional node by which the first bi-directional node is associated with the second bi-directional node. The inward connection object may be indicative of a secondary role associated with the second bi-directional node by which the second bi-directional node may be associated with the first bi-directional node. Therefore, the primary role and the secondary role are indicative of a capacity in which the first bi-directional node and the second bi-directional node are mutually associated. A bi-directional node is loaded in the executable graph-based model based on its requirement. In an instance, when the bi-directional node is not required, the bi-directional node is stored along with the first connection link in a storage element of the overlay system. Therefore, in instances when the bi-directional node is loaded, the first connection link is also loaded. Additionally, since the first connection link also includes the secondary role associated with the second bi-directional node, the second bi-directional node is also loaded.

Thus, the loading of one bi-directional node can lead to the loading of all associated bi-directional nodes by way of connection links. This eliminates the requirement of executing multiple look-up operations for identifying the associated bi-directional nodes. Hence, the bi-directional nodes may be loaded in significantly less time, thus increasing throughput and decreasing latency associated with operations performed in the overlay system.

Figure Description:

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
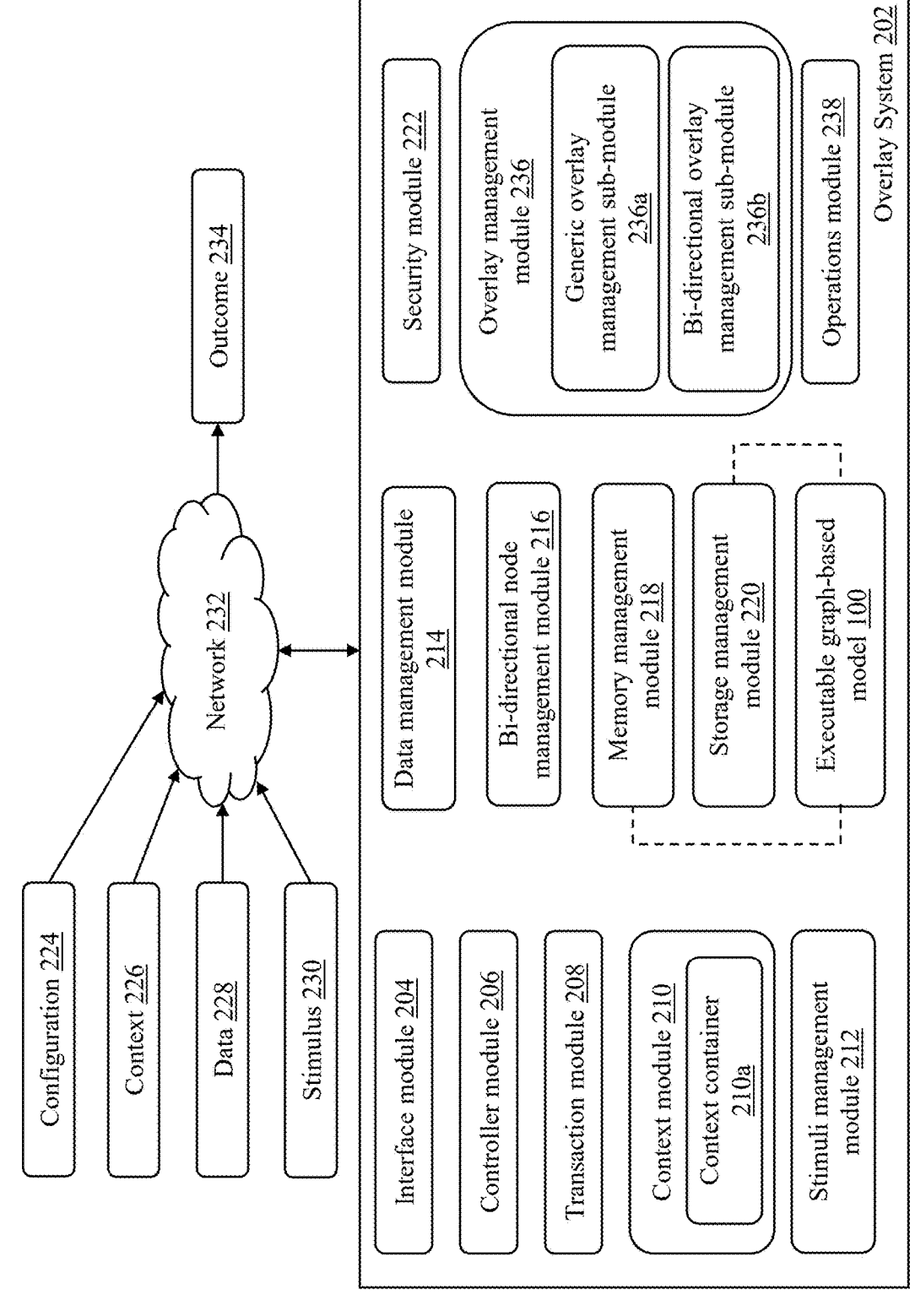
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a data management module 214, a bi-directional node management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes an overlay management module 236 and an operations module 238. In some embodiments, all the modules of the overlay system 202 except for the executable graph-based model 100 may collectively form processing circuitry that facilitates operations associated with a plurality of nodes including generic nodes and bi-directional nodes, in the executable graph-based model 100. A generic node may refer to nodes, in the executable graph-based model 100, with an edge node-type, a role node-type, or a vertex node-type. A generic node with the vertex node-type is coupled to another generic node with the vertex node-type by way of a node with the edge node-type indicative of a role of the generic node. A bi-directional node refers to a node with an edge node-type that associates with another bi-directional node by way of a connection link that includes a primary role for the bi-directional node and a secondary role for the other bi-directional node.

The overlay system 202 may include suitable logic, circuitry, interfaces, and/or code, executable by the circuitry, that may be configured to facilitate one or more operations associated with the bi-directional nodes in the executable graph-based model 100.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts (such as the context 226) provide the basis for all interactions within the executable graph-based model 100. Processing of such stimuli may lead to the execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as username, password, access token, device information, time stamp, one or more relevant identifiers (IDs), or the like, that are required for processing of the stimulus 230 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

As shown, the context module 210 includes a context container 210a that includes a set of defined contexts. Each defined context of the set of defined contexts pertains to a context that is associated with one or more operations for facilitating the application and management of the plurality of nodes (for example, the bi-directional nodes) in the overlay system 202. That is to say that one or more contexts of the set of defined contexts are indicative of the one or more operations to be executed by way of one or more bi-directional nodes in the overlay system 202. The one or more operations are executed when a context of a corresponding stimuli matches one of the set of defined contexts.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a signal, a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on the processing of data by any of its nodes. In some examples, the processing of a stimulus (such as the stimulus 230) results in the generation, communication, or processing of data that further results in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The data management module 214 may include suitable logic, circuitry, interfaces, and/or code, executable by the circuitry, configured to manage all data or information within the overlay system 202 (e.g., the data 228) for a given application. Operations performed by the data management module 214 include data loading, data unloading, data modeling, and data processing. The data management module 214 is communicatively coupled (e.g., connected either directly or indirectly) to one or more other modules within the overlay system 202 to complete some or all of these operations. For example, data storage is handled by the data management module 214 in conjunction with the storage management module 220.

The bi-directional node management module 216 may include suitable logic, circuitry, interfaces, and/or code, executable by the circuitry, configured to manage the design and implementation of bi-directional nodes in the overlay structure 202. The bi-directional node management module 216 is further configured to facilitate operations associated with the execution of one or more operations using the bi-directional nodes.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100. Throughout the description, the terms 'overlay' and 'overlay node' are used interchangeably.

The storage management module 220 may include suitable logic, circuitry, interfaces, and/or code, executable by the circuitry, configured to manage the temporary or permanent storage of data associated with the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device that stores the executable graph-based model 100. The overlay system 202 further includes a plurality of manifest storages. The manifest storages are used by the memory management module 218 and the storage management module 220 to facilitate the storage of manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 5.

The security module 222 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the overlay management module 236 for managing and executing security-based overlays.

The overlay management module 236 may include suitable logic, circuitry, interfaces, and/or code, executable by the circuitry, configured to manage all overlays within the overlay system 202. The overlays may be generic overlays or bi-directional overlays. Bi-directional overlays are nodes that are associated with one or more bi-directional nodes by way of a direct connection or a connection link. A bi-directional overlay may be associated with a bi-directional node by extending the functionality of the bi-directional node. Alternatively, the bi-directional overlay node may be associated with the bi-directional node by way of a connection link such that the connection link includes a primary role for the bi-directional node and a secondary role for the bi-directional overlay. Generic nodes are nodes of the executable graph-based model 100 that are not bi-directional nodes. Generic overlays are associated with generic nodes and/or bi-directional nodes and extend the functionality of the generic nodes and/or bi-directional nodes. Operations performed by the bi-directional node management module 216 include overlay storage management, overlay structure modeling, overlay logic creation and execution, and overlay loading and unloading (within the executable graph-based model 100). The bi-directional management module 216 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The overlay management module 236 may include a generic overlay management sub-module 236a and a bi-directional overlay management sub-module 236b. The generic overlay management sub-module 236a is configured to perform operations of the overlay management module 236 that are associated with the generic overlays. The bi-directional overlay management sub-module 236b is configured to perform operations of the overlay management module 236 that are associated with the bi-directional overlays.

The operations module 238 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or functional programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model, specifically, the concept of a node. Unlike conventional graph-based systems, all elements (e.g., data, overlays, etc.) within the executable graph-based model 100 are implemented as nodes. As will become clear, this allows executable graph-based models to be flexible, extensible, and highly configurable.

Figure 3A:
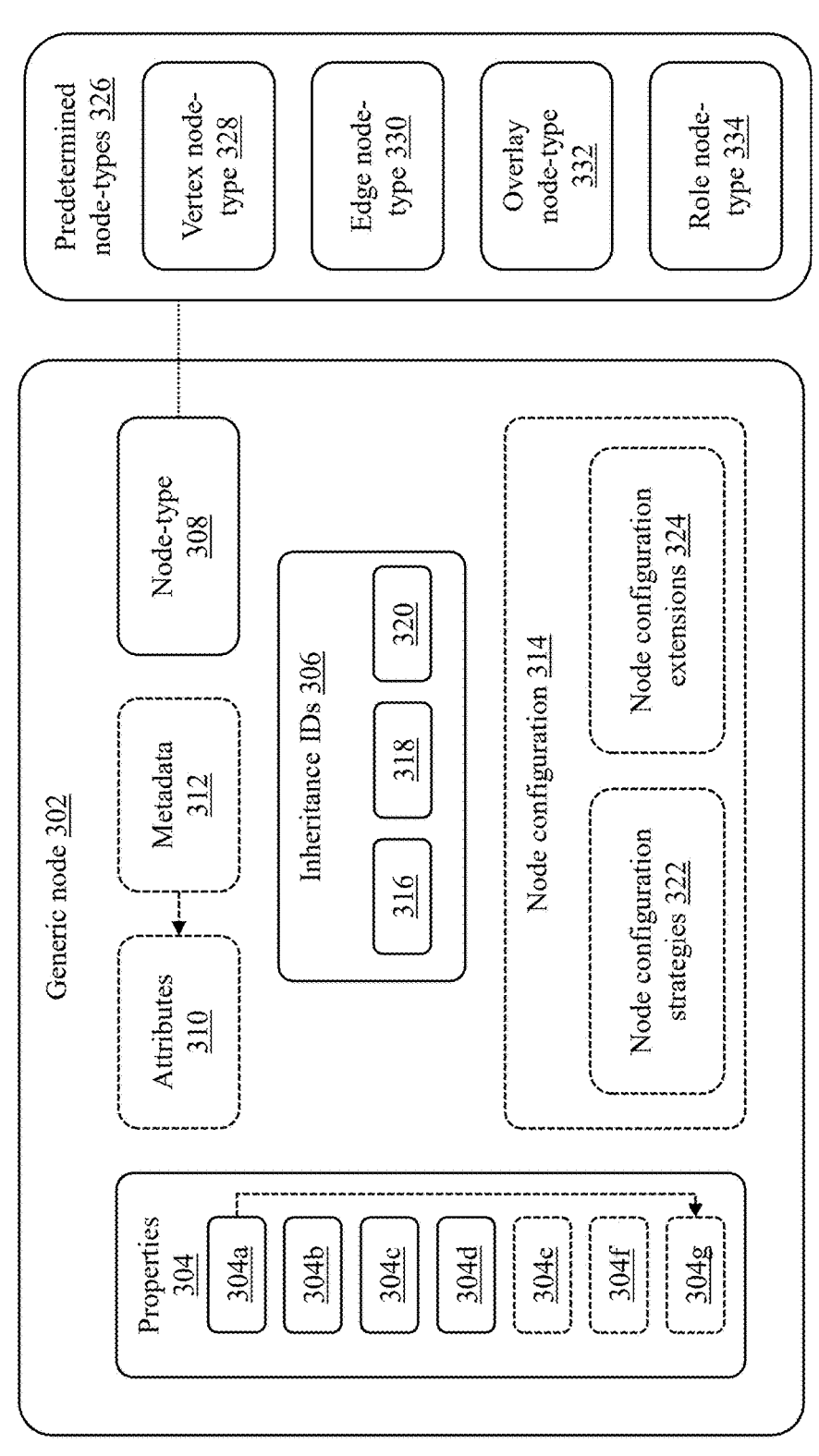
FIG. 3A is a block diagram that illustrates a standard structure of a generic node within the executable graph-based model, consistent with disclosed embodiments of the present disclosure.

FIG. 3A is a block diagram 300A that illustrates a standard structure of a generic node 302 within the executable graph-based model 100, consistent with disclosed embodiments of the present disclosure. Referring to FIG. 3A, the generic node 302 corresponds to a generic node of the executable graph-based model 100. The generic node 302 further corresponds to the core structure of the executable graph-based model 100 and forms the foundational building block for all data and processing logic within the executable graph-based model 100. The generic node 302 includes properties 304, inheritance IDs 306, and a node-type 308. The generic node 302 optionally includes one or more attributes 310, metadata 312 associated with the attributes 310, and a node configuration 314.

The properties 304 of the generic node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the generic node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the generic node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the generic node 302 is incremented when the generic node 302 undergoes transactional change. This allows the historical changes between versions of the generic node 302 to be tracked by modules or overlays within the overlay system 202. The namespace 304c of the generic node 302, along with the name 304d of the generic node 302, is used to help organize nodes within the executable graph-based model 100. That is, the generic node 302 is assigned a unique name 304d within the namespace 304c such that the name 304d of the generic node 302 need not be unique within the entire executable graph-based model 100, only within the context of the namespace 304c to which the generic node 302 is assigned. The generic node 302 optionally includes one or more icons 304e which are used to provide a visual representation of the generic node 302 when visualized via a user interface. The one or more icons 304e can include icons at different resolutions and display contexts such that the visualization of the generic node 302 is adapted to different display settings and contexts. The generic node 302 also optionally includes one or more labels 304f which are used to override the name 304d when the generic node 302 is rendered or visualized.

The generic node 302 supports the concept of inheritance of data and processing logic associated with any other node of the executable graph-based model 100 that is inherited by the generic node 302. This allows the behavior and functionality of the generic node 302 to be extended or derived from the inherited node of the executable graph-based model 100. The inheritance IDs 306 of the generic node 302 indicate the inheritance-based information, which may apply to the generic node 302. The inheritance IDs 306 comprise a set of Boolean flags that identify the inheritance structure of the generic node 302. The abstract flag 316 allows the generic node 302 to support the construct of abstraction. When the abstract flag 316 takes a value 'true', the generic node 302 is flagged as abstract that is to say that it cannot be instantiated or created within an executable graph-based model (e.g., the executable graph-based model 100). Thus, in an instance when the generic node 302 has the abstract flag 316 set to 'true', the generic node 302 may only form the foundation of other nodes that inherit therefrom. By default, the abstract flag 316 of the generic node 302 is set to 'false'. The leaf flag 318 is used to indicate whether any other node may inherit from the generic node 302. If the leaf flag 318 is set to 'true', no other node may inherit from the generic node 302 (but unlike an abstract node, a node with the leaf flag 318 set may be instantiated and created within the executable graph-based model 100). The root flag 320 is used to indicate whether the generic node 302 inherits from any other node. If the root flag 320 is set to 'true', the generic node 302 does not inherit from any other node. The generic node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the generic node 302 is used to extend the functionality of the generic node 302. All nodes within the executable graph-based model 100 comprise a node-type that defines additional data structures and implements additional executable functionality. A node-type thus includes data structures and functionality that are common across all nodes that share that node-type. Therefore, the composition of a node with a node-type improves extensibility by allowing the generation of specialized node functionalities for specific application areas. Such extensibility is not present in prior art graph-based models. As illustrated in FIG. 3A, the generic node 302 and the node-type 308 are one logical unit that is not separated in the context of an executing system at run-time (e.g., in the context of execution of an executable graph-based model).

FIG. 3A further shows the plurality of predetermined node-types 326 which provides a non-exhaustive list of node-types for the node-type 308 associated with the generic node 302. The plurality of predetermined node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node-types 326 further includes an overlay node-type 332 and a role node-type 334. As will be described in more detail below, a node with the overlay node-type 332 is used to extend the functionality of a node, such as the generic node 302, to incorporate processing logic. Unlike non-overlay nodes, an overlay node (e.g., a node having a overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type can have is not limited.

The one or more attributes 310 correspond to the data associated with the generic node 302 (e.g., the data represented by the generic node 302 within the executable graph-based model 100 as handled by the data management module 214). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the generic node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the generic node 302 further includes the metadata 312 (e.g., data stored as a name, a confidentiality indicator for indicating data as sensitive and/or confidential, an average processing time required for processing data, or the like) which is associated with either the generic node 302 or an attribute (for example, the one or more attributes 310) of the generic node 302. An attribute within the one or more attributes 310 may either have an independent state or a shared state. That is to say, an attribute may be a value-shared attribute or a non-value-shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, updating the data (e.g., the value) of this shared attribute will be reflected across both nodes.

The node configuration 314 provides a high degree of configurations for the different elements of the generic node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the generic node 302, which creates message source IDs. A further example of a concrete node configuration strategy 322 is a versioning strategy, associated with the configuration of the version ID 304b of the generic node 302, which supports major and minor versioning (depending on the type of transactional change incurred by the generic node 302). The versioning strategy may be adapted to a native filing system of a user device hosting the overlay system 202 or a third-party data storage (for example, Snowflake®) associated with the overlay system 202.

Figure 3B:
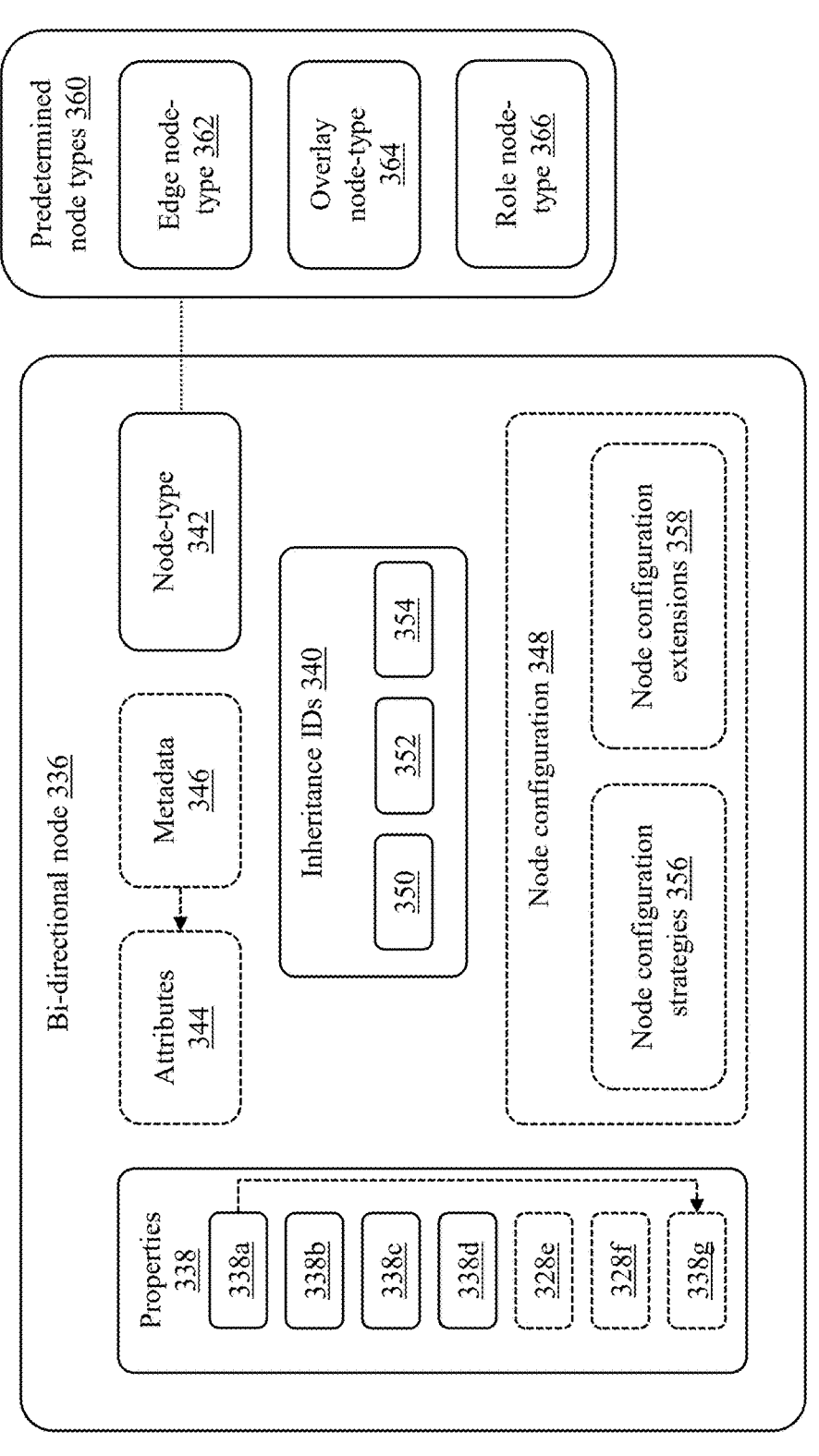
FIG. 3B is a block diagram that illustrates a standard structure of a bi-directional node within the executable graph-based model, consistent with disclosed embodiments of the present disclosure.

FIG. 3B is a block diagram 300B that illustrates a standard structure of a bi-directional node 336 within the executable graph-based model 100, consistent with disclosed embodiments of the present disclosure. Referring to FIG. 3B, the bi-directional node 336 corresponds to the core structure of the executable graph-based model 100 and forms the foundational building block for various data and processing logics within the executable graph-based model 100. The bi-directional node 336 includes properties 338, inheritance IDs 340, a node-type 342, attributes 344, metadata 346, and a node configuration 348.

The properties 338 include a unique ID 338a, a version ID 338b, a namespace 338c, a name 340d, one or more icons 340e, one or more labels 340f, and one or more alternative IDs 340g. The property 338 of the bi-directional node 336 is the same as the properties 304 of the generic node 302. In other words, the unique ID 338a, the version ID 338b, the namespace 338c, the name 338d, the one or more icons 338e, the one or more labels 338f, and the one or more alternative IDs 338g are same as the unique ID 304a, the version ID 304*b*, the namespace 304*c*, the name 304*d*, the one or more icons 304*e*, the one or more labels 304*f*, and the one or more alternative IDs 304*g*, respectively, of the generic node 302.

The inheritance IDs 340 of the bi-directional node 336 include an abstract flag 350, a leaf flag 352, and a root flag 354. The inheritance IDs 340 of the bi-directional node 336 is the same as the inheritance IDs 306 of the generic node 302. In other words, the abstract flag 350, the leaf flag 352, and the root flag 354 are the same as the abstract flag 316, the leaf flag 318, and the root flag 320, respectively, of the generic node 302.

The node configuration 348 of the bi-directional node 336 includes node configuration strategies 356 and node configuration extensions 358. The node configuration 348 is the same as the node configuration 314 of the generic node 302. In other words, the node configuration strategies 356 and the node configuration extensions 358 of the bi-directional node 336 are the same as the node configuration strategies 322 and the node configuration extensions 324, respectively, of the generic node 302.

The bi-directional node 336 may have the node-type 342 that may be one of the predetermined node types 360. The predetermined node-types 360 of the bi-directional node 336 may include an edge node-type 362, an overlay node-type 364, and a role node-type 366. The edge node-type 362 is the same as the edge node-type 330. The overlay node-type 364 is the same as the overlay node-type 332, whereas the role node-type 366 is the same as the role node-type 334. Notably, the bi-directional node 336 has the edge node-type 362. In some embodiments, the bi-directional node 336 may be a combination of the edge node-type 362 and the overlay node-type 364. In such embodiments, the bi-directional node 336 may exhibit properties of the edge node-type 362 as well as the overlay node-type 364. Also, in such embodiments, the bi-directional node 336 may be a bi-directional overlay node. In some embodiments, the bi-directional node 336 may be a combination of the edge node-type 362 and the role node-type 366. In such embodiments, the bi-directional node 336 may exhibit properties of the edge node-type 362 as well as the role node-type 366. Also, in such embodiments, the bi-directional node 336 may be a connection node and form a part (for example, an inward connection object (ICO), an outward connection object (OCO), or the like) of a connection link that couples an associated bi-directional node with another bi-directional node. In some embodiments, the bi-directional node 336 may be associated with another bi-directional node by way of a connection link that includes an ICO and an OCO. The bi-directional node 336 may be associated with the ICO or the OCO such that the bi-directional node may own the associated ICO or OCO. Further, the associated ICO or the OCO may also be indicative of a primary role or secondary role associated with the bi-directional node 336.

For the sake of brevity, a node of the executable graph-based model 100, that is not a bi-directional node, is referred to as a generic node. Additionally, an overlay node of the executable graph-based model 100, that is a bi-directional node is referred to as a bi-directional overlay node.

Figure 4A:
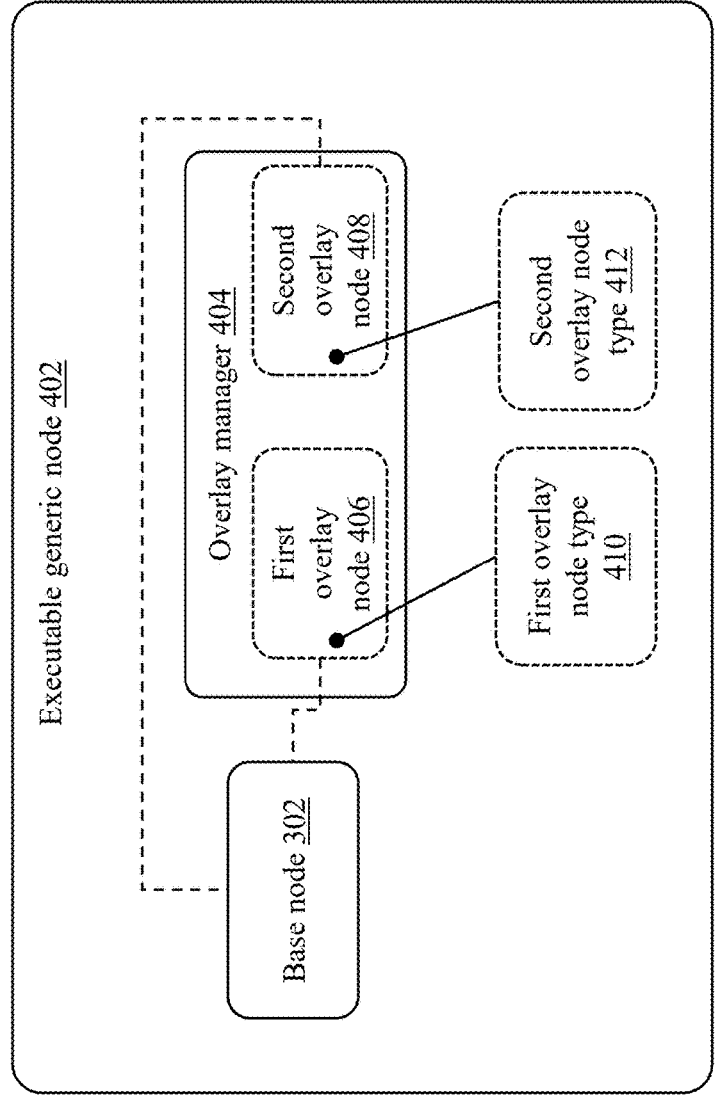
FIG. 4A is a block diagram that illustrates an executable generic node within the executable graph-based model, consistent with disclosed embodiments of the present disclosure.
Figure 4A:

FIG. 4A is a block diagram 400A that illustrates an executable generic node 402 within the executable graph-based model 100, consistent with disclosed embodiments of the present disclosure. Referring to FIG. 4A, the executable generic node 402 is shown to include a base node (e.g., the generic node 302) and an overlay manager 404. For the sake of ongoing discussion, the base node corresponds to the generic node 302, and is hereinafter referred to as the "base node 302". The base node 302 when extended by way of one or more overlay nodes becomes the executable generic node 402.

The overlay manager 404 includes a first overlay node 406 and a second overlay node 408. The executable generic node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable generic node 402). As shown, the first overlay node 406 has a first overlay node-type 410, and the second overlay node 408 has a second overlay node-type 412. Examples of overlay node-type include, but are not limited to, an encryption overlay node-type and a publisher overlay node-type.

A node with the encryption overlay node-type is an encryption overlay node that is indicative of an encryption technique using which an associated node is to be secured. The encryption overlay node also includes processing logic to secure a corresponding node. Examples of the encryption technique include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output.

Although, the executable generic node 402 is shown to include the first and second overlay nodes 406 and 408, in other embodiments, the executable generic node 402 may include any number of overlay nodes, without deviating from the scope of the present disclosure.

The executable generic node 402 extends the base node 302 (or is a subtype of the base node 302) such that all the functionality and properties of the base node 302 are accessible to the executable generic node 402. The executable generic node 402 also dynamically extends the functionality of the base node 302 by associating the overlay nodes maintained by the overlay manager 404 with the base node 302. The executable generic node 402 may thus be considered a combination of the base node 302 and the first and second overlay nodes 406 and 408. The executable generic node 402 may be alternatively referred to as a node with overlay(s). Therefore, the executable generic node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, a role node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4A) and the functionality that acts upon that data (e.g., an overlay node) can be separated and independently maintained offline, but at run-time, an association between the data node and the overlay node is determined and an executable node is generated (e.g., the executable generic node 402 shown in FIG. 4A).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 406 or the second overlay node 408, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable generic node 402 is responsible for executing all overlays registered therewith. The overlay manager 404 also coordinates the execution of all associated overlay nodes. As shown in FIG. 4A, the executable generic node 402 associates the base node 302 with two overlay nodes that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

Figure 4B:
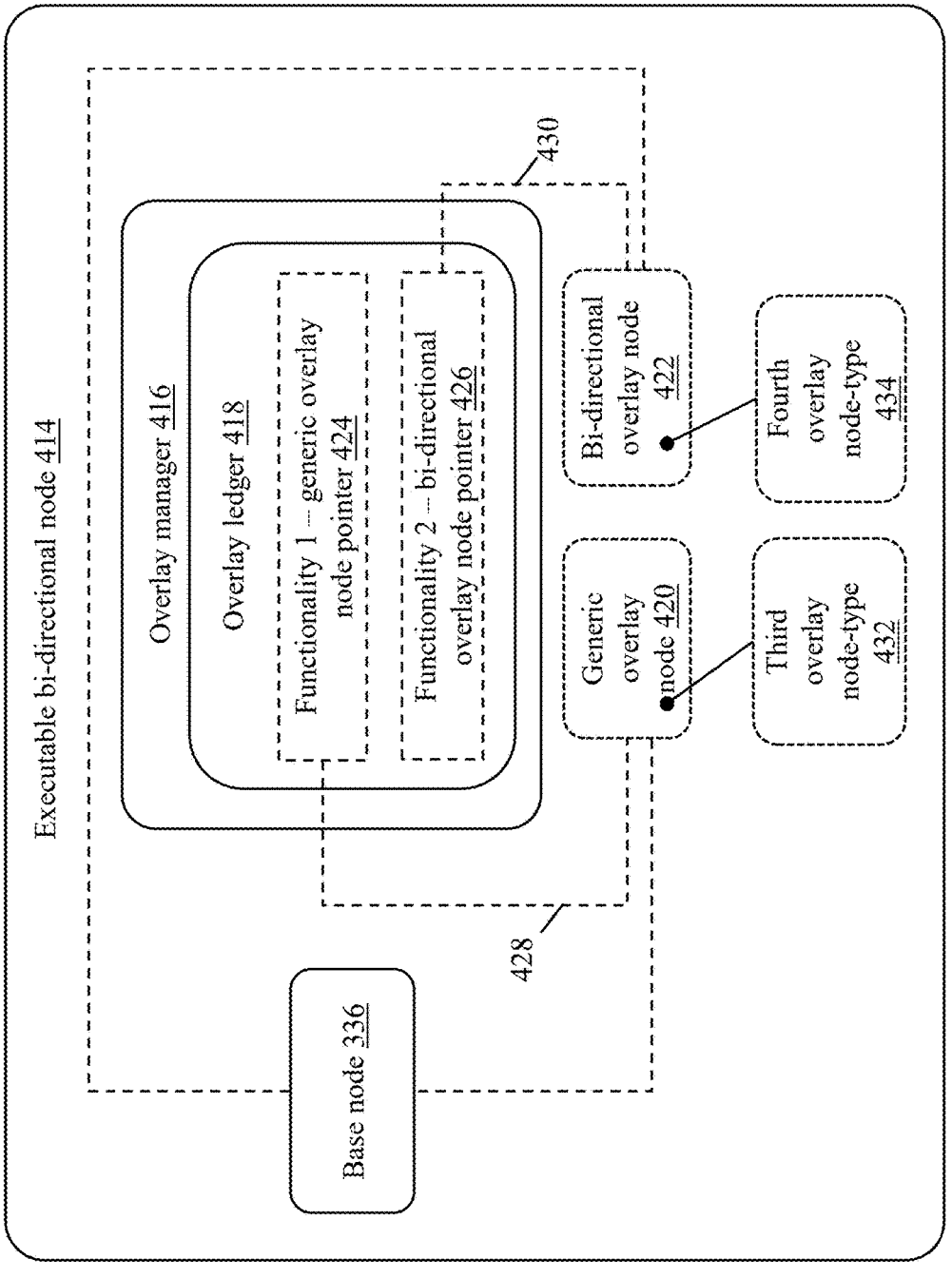
FIG. 4B is a block diagram that illustrates an executable bi-directional node within the executable graph-based model, consistent with disclosed embodiments of the present disclosure.

FIG. 4B is a block diagram 400B that illustrates an executable bi-directional node 414 within the executable graph-based model 100, consistent with disclosed embodiments of the present disclosure. Referring to FIG. 4B, the executable bi-directional node is shown to include a base node (for example, the bi-directional node 336) and an overlay manager 416. Hereinafter, the base node is referred to as the base node 336. The base node 336 being a bi-directional node may have the edge node-type 362. The base node 336 may be associated with a generic overlay node and/or a bi-directional overlay node. The overlay manager 416 has a description that is similar to the description of the overlay manager 404. In addition, the overlay manager 416 creates and maintains an overlay ledger 418.

The overlay ledger 418 may refer to a list of overlays associated with the base node 336 and functionalities associated with each of the overlays. The overlay ledger 418 further includes a pointer associated with each entry in the overlay ledger 418 that points to a corresponding overlay node associated with the base node 336. As shown, the base node 336 is extended by way of a generic overlay node 420 and a bi-directional overlay node 422. Based on the association of the generic overlay node 420 and the bi-directional overlay node 422 with the base node 336, the overlay manager 416 creates entries 424 and 426 for the generic overlay node 420 and the bi-directional overlay node 422, respectively. As shown, for the generic overlay node 420 and the bi-directional overlay node 422, the entries 424 and 426 include functionalities and pointers 428 and 430, respectively, that point to corresponding overlay nodes. For example, the pointer 428 associated with the entry 424 points to the generic overlay node 420, and the pointer 430 associated with the entry 426 points to the bi-directional overlay node 422. The generic overlay node 420 may have a third overlay node type 432 whereas the bi-directional overlay node 422 may have a fourth overlay node-type 434. The third overlay node-type 432 and the fourth overlay node-type 434 may be the same as the first and second overlay node-types 410 and 412 as described in conjunction with FIG. 4A. Notably, the structure of the bi-directional overlay node 322 may be the same as the bi-directional node 336 whereas processing logic associated with the bi-directional overlay node 322 may be similar to generic overlay nodes (for example, the first overlay node 406 and the second overlay node 408) shown in FIG. 4A. In other embodiments, processing logic associated with the bi-directional overlay node 322 may be different from generic overlay nodes in the executable graph-based model 100.

In an instance, one of the generic overlay node 420 and the bi-directional overlay node 422 may be required to be executed. In such an instance, the overlay manager 416 may identify a relevant overlay node based on the functionality of one of the generic overlay node 420 and the bi-directional overlay node 422 as per the overlay ledger 418. Upon identification of the relevant overlay node, the overlay manager 416 may trigger the relevant overlay node by way of a corresponding pointer.

In some embodiments, the data and the processing logic associated with generic overlays and bi-directional overlays may be non-persistent. Such generic overlays and bi-directional overlays are known as stateless overlays. Notably, processing logic and outputs associated with stateless overlays cease to exist based on the unloading of the overlays and require to be recreated as and when required.

In some embodiments, the data and the processing logic associated with generic overlays and bi-directional overlays may be persistent. Such generic overlays and bi-directional overlays are known as stateful overlays. Notably, processing logic and outputs associated with stateful overlays are stored in the storage element of the overlay system 202 and may be loaded in the executable graph-based model 100 and used as and when required. The persistent nature of the data and the processing logic associated with an executable node and an associated generic overlay node are described in detail in conjunction with FIG. 5.

Throughout the description, an executable node (for example, the executable generic node 402 and the executable bi-directional node 414) is represented by way of two concentric circles. In other words, the executable node is represented by way of an inner circle encircled by an outer circle, where the incircle represents a base node and the outer circle represents an overlay node associated with the base node.

Figure 5:
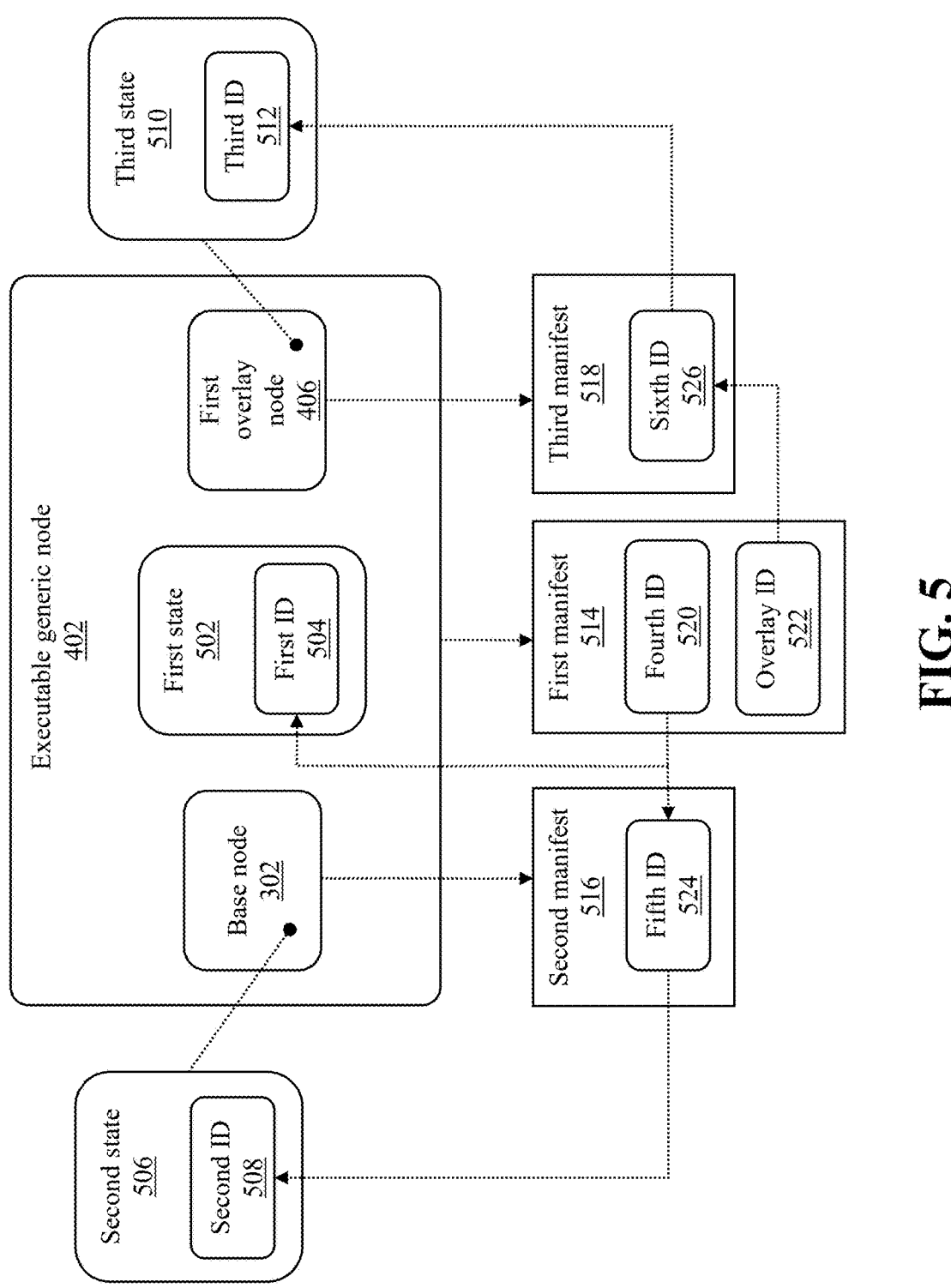
FIG. 5 is a block diagram that illustrates a composition of the executable generic node that enables persistent storage of data and processing logic associated therewith, consistent with disclosed embodiments of the present disclosure.

FIG. 5 is a block diagram 500 that illustrates a composition of the executable generic node 402 that enables persistent storage of data and the processing logic associated therewith, consistent with disclosed embodiments of the present disclosure.

As described in conjunction with FIG. 4A, the executable generic node 402 includes the base node 302 and one or more overlay nodes (e.g., the first and second overlay nodes 406 and 408). For the brevity of the ongoing description, the persistent storage is explained for the executable generic node 402 including only the first overlay node 406. One or more operations performed for ensuring the persistence of the first overlay node 406 may be performed for the second overlay node 408 as well.

Referring to FIG. 5, the executable generic node 402 includes the base node 302 and the first overlay node 406. The executable generic node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable generic node 402, and the first overlay node 406. In an embodiment, the manifests may be generated by the storage management module 220. The first manifest 514 is associated with the executable generic node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable generic node 402 includes data required to reconstruct the executable generic node 402 (e.g., attributes, properties, etc.). The first state 502 of the executable generic node 402 is persistently stored along with the first ID 504. The first manifest 514 is generated for the executable generic node 402 and has (i) the fourth ID 520 (which is the same as the first ID 504), (ii) the storage location of the first state 502 of the executable generic node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable generic node 402. Further, the overlay ID 522 is the same as the sixth ID 526 of the state of the first overlay node 406. Therefore, the first manifest 514 may be used to identify and retrieve the states of the base node 302, the executable generic node 402, and the first overlay node 406. Subsequently, the retrieved states may be used to reconstruct the executable generic node 402 and the first overlay node 406. In an instance, the executable generic node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has the fifth ID 524 and the storage location of the second state 506 of the base node 302. The second ID 508 of the second state 506 and the fifth ID 524 of the second manifest 516 are the same as the first ID 504 of the first state 502 of the executable generic node 402 (which is also the same as the fourth ID 520 of the first manifest 514 of the executable generic node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable generic node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable generic node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable generic node 402) of the first manifest 514, the first state 502 is identified and retrieved. Subsequently, the executable generic node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

Based on a context of a stimulus (for example, the stimulus 230) associated with the overlay system 202, the processing logic (such as the context module 210) may determine an ID that is the same as the fifth ID 524. Based on the determined ID, the processing logic (such as the memory management module 218 and the storage management module 220) may identify the second manifest 516. Subsequently, the processing logic (such as the memory management module 218 and the storage management module 220) may identify the second state 506 that has the second ID 508 that matches the fifth ID 524. Further, the processing logic (such as the memory management module 218 and the storage management module 220) may retrieve the second state 506 associated with the second manifest 516 from a corresponding storage element. Subsequently, the processing logic (such as the memory management module 218 and the storage management module 220) may determine, by checking the manifest storage(s) associated with the overlay system 202, whether there is another manifest (such as the first manifest of the executable generic node 402) with an ID that matches the second ID 508 and the fifth ID 524. Notably, the first manifest 514 includes storage locations of each overlay node (for example, the first overlay node 406) of the executable generic node 402. Based on the overlay ID 522 included in the first manifest 514 that matches the sixth ID 526 included in the third manifest 518, the processing logic (such as the memory management module 218 and the storage management module 220) may identify and retrieve the third manifest 518 from a manifest storage of a plurality of manifest storages of the overlay system 202. Subsequently, the processing logic (such as the memory management module 218 and the storage management module 220) may identify the third state 510 which has the third ID 512 that matches the sixth ID 526. Further, the processing logic (such as the memory management module 218 and the storage management module 220) may retrieve the third state 510 associated with the third manifest 518 from a corresponding storage element. To determine whether the first overlay node 406 has an overlay node associated therewith, the processing logic (such as the memory management module 218 and the storage management module 220) may also perform a check to determine whether any of the plurality of manifest storages of the overlay system 202 includes any other manifest with an ID that matches the sixth ID 526. Since the first overlay node 406 does not have an overlay associated therewith, no other manifest has the ID that matches the sixth ID.

Notably, the manifest (the third manifest 518) of the first overlay node 406 includes a reference (such as an identifier that is common to the second manifest 516 and the third manifest 518, a link, a path, a storage location, or the like) to the second manifest 516 of the base node 302. Therefore, the re-formation of the executable generic node 402 includes a re-creation of the first overlay node 406 prior to a re-creation of the base node 302. Subsequently, the first overlay node 406 and the base node 302 are organized by associating the base node 302 with the first overlay node 406 to re-form the executable generic node 402.

In some embodiments, the first overlay node 406 may not be loaded in case it is not required for executing the operation associated with the stimulus 230. The loaded executable generic node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 218, the storage management module 220, a combination of these, or any other module of the overlay system 202. Also, all manifest states are stored together at a storage location (such as a manifest storage) that is known to the storage management module 220. Such centralized storage of the manifest states ensures that node states associated therewith are easily accessible.

It will be apparent to a person skilled in the art that although FIG. 5 illustrates only a single generic overlay node associated with a generic node, in other embodiments, the executable generic node 402 may include additional or different generic overlay nodes (for example, the second overlay node 408). It will also be apparent to a person skilled in the art that only those overlay nodes that are required for responding to the stimulus 230 may be loaded.

It will be apparent to a person skilled in the art that the executable bi-directional node 414 may be loaded in a manner that is similar to the loading of the executable generic node 402.

The overlay system 202 described in conjunction with FIGS. 1-5 is used to facilitate one or more operations associated with the plurality of bi-directional nodes in the executable graph-based model 100. Various concepts and features associated with the bi-directional nodes are described in detail later in the description.

Figure 6:
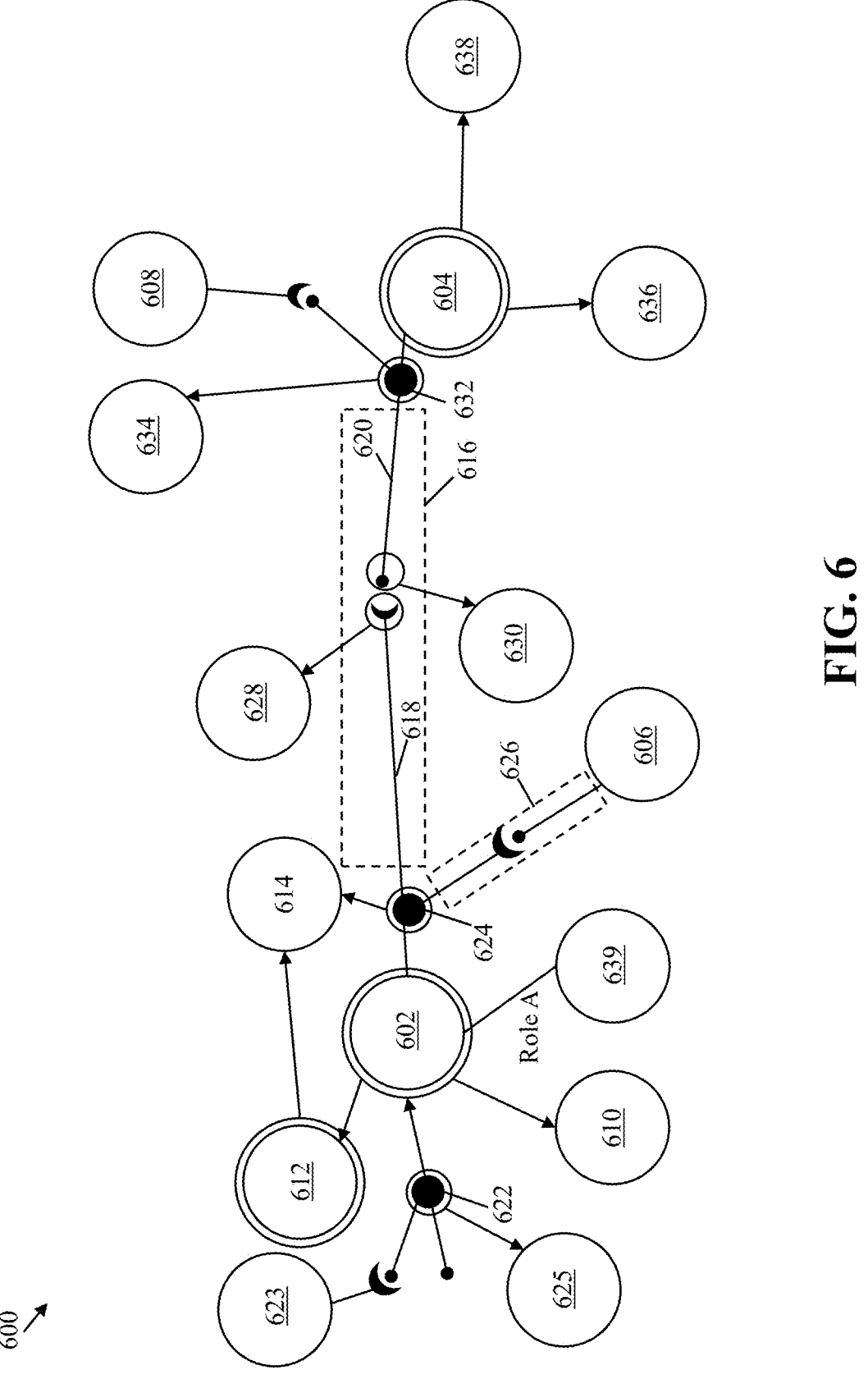
FIG. 6 illustrates a block diagram that depicts features of bi-directional nodes, consistent with disclosed embodiments of the present disclosure.

FIG. 6 illustrates a block diagram 600 that depicts features of bi-directional nodes, consistent with disclosed embodiments of the present disclosure. Referring to FIG. 6, shown is the executable graph-based model 100 that includes the plurality of bi-directional nodes including bi-directional nodes 602 through 608. The executable bi-directional node 602 is extended by way of a generic overlay node 610 and a bi-directional overlay node 612 that is further extended by way of an overlay node 614. The overlay node 614 may be a generic overlay node or a bi-directional overlay node.

As shown, the executable bi-directional node 602 is associated with the executable bi-directional node 604 by way of a connection link 616. The connection link 616 includes an OCO 618 and an ICO 620. In other words, the OCO 618 and the ICO 620, collectively, form the connection link 616. The OCO 618 is owned by the executable bi-directional node 602 whereas the ICO 620 is owned by executable bi-directional node 604. The OCO 618 may include a primary role associated with the executable bi-directional node 602, whereas the ICO 620 may include a secondary role associated with the executable bi-directional node 604. The primary role may be indicative of a capacity in which the executable bi-directional node 602 is associated with the executable bi-directional node 604. The secondary role may be indicative of a capacity in which the executable bi-directional node 604 is associated with the executable bi-directional node 602. The primary role and the secondary role may be complementary. In other words, the primary role and the secondary role, collectively, are indicative of a mutual relationship/association between the bi-directional nodes 602 and 604. In an example, the executable bi-directional node 602 may represent a manager of a team whereas the executable bi-directional node 604 may represent an associate working under the manager of the team. In such an example, the primary role may be 'manager', and the secondary role may be 'associate'. Hence, the connection link 616 may indicate that the mutual association between the bi-directional nodes 602 and 604 may be of a manager and associate.

In some embodiments, the connection link 616 may be realized as a node (for example, a bi-directional node) with a role node-type. In such embodiments, the OCO 618 and the ICO 620 may also be associated with corresponding generic overlay nodes and/or bi-directional overlay nodes.

In some embodiments, the association between the bi-directional nodes 602 and 604 may be based on a dependency therebetween. The connection link 616 may be further indicative of the dependency between the bi-directional nodes 602 and 604. The dependency between the bi-directional nodes 602 and 604 may be at least one of an own-owned dependency, a use-used dependency, or a share-shared dependency.

In some embodiments, when the dependency between the bi-directional nodes 602 and 604 may be the own-owned dependency, the executable bi-directional node 602 may own the executable bi-directional node 604. The executable bi-directional node 604 may be exclusive to the executable bi-directional node 602 which may exclusively use the executable bi-directional node 604. In other words, the executable bi-directional node 602 may exclusively use data and/or processing logic associated with the executable bi-directional node 604. In an instance, when the dependency between the bi-directional nodes 602 and 604 may be the own-owned dependency, the primary role associated with the executable bi-directional node 602 may be 'own' and the secondary role associated with the executable bi-directional node 604 may be 'owned'.

In some embodiments, when the dependency between the bi-directional nodes 602 and 604 may be the use-used dependency, the executable bi-directional node 602 may exclusively use the executable bi-directional node 604 at a given time-instance. In other words, the executable bi-directional node 602 may exclusively use data and/or processing logic associated with the executable bi-directional node 604 at the given time-instance. The executable bi-directional node 604 may be used by another bi-directional node associated therewith at a time instance later or prior to the given time-instance. In an instance, when the dependency between the bi-directional nodes 602 and 604 may be the use-used dependency, the primary role associated with the executable bi-directional node 602 may be 'use' and the secondary role associated with the executable bi-directional node 604 may be 'used'.

In some embodiments, when the dependency between the bi-directional nodes 602 and 604 may be the share-shared dependency, the executable bi-directional node 602 may use the executable bi-directional node 604 while sharing the executable bi-directional node 604 with one or more other bi-directional nodes associated therewith. In other words, the executable bi-directional node 602 may use the data and/or processing logic associated with the executable bi-directional node 604 while sharing the executable bi-directional node 604 with the one or more other bi-directional nodes. In other words, the executable bi-directional node 604 may be simultaneously used by the executable bi-directional node 602 and the one or more other bi-directional nodes. In an instance, when the dependency between the bi-directional nodes 602 and 604 may be the share-shared dependency, the primary role associated with the executable bi-directional node 602 may be 'share' and the secondary role associated with the executable bi-directional node 604 may be 'shared'.

As shown, based on a stimulus, the executable bi-directional node 602 may receive input from a first set of bi-directional nodes associated therewith via an inward group object 622. An inward group object is a logical part of an associated bi-directional node that receives inputs via ICOs of one or more connection links associated therewith. The inward group object 622 may be a convergence point for one or more ICOs of various connection links associated with the executable bi-directional node 602. The first set of bi-directional nodes may include a bi-directional node 623 associated with the executable bi-directional node 602 via an associated connection link such that an OCO of the connection link is associated with the bi-directional node 623 and an ICO of the connection link is associated with the executable bi-directional node 602. Similarly, the first set of bi-directional nodes may include another bi-directional node (not shown) associated with the executable bi-directional node 602 via an associated connection link such that an ICO of the connection link is associated with the inward group object 622. To summarize, an operation associated with the stimulus may be executed based on the first set of bi-directional nodes associated with the executable bi-directional node 602 via the inward group object 622.

In an instance, the inward group object 622 may forward the inputs, received from the bi-directional node 623 and the other bi-directional node, separately to the executable bi-directional node 602. In another instance, the inward group object 622 may forward the inputs, received from the bi-directional node 623 and the other bi-directional node, as a combined input signal to the executable bi-directional node 602. Therefore, the operation associated with the stimulus may be executed further based on the inward group object 622, the bi-directional node 623, and the other bi-directional node communicating with the executable bi-directional node 602 via the inward group object 622.

In some embodiments, the inward group object 622 may be associated with one or more overlay nodes (for example, an overlay node 625). The overlay node 625 associated with the inward group object 622 may be a generic overlay node or a bi-directional overlay node). In such embodiments, processing logic associated with the one or more overlay nodes may be executed on the inputs received at the inward group object 622. Subsequently, an output of the execution may be provided to the executable bi-directional node 602 as the input (for example, a stimulus). Therefore, the operation associated with the stimulus may be executed further based on the overlay node 625 associated with the inward group object 622.

In other embodiments, one or more connection links that provide input to the executable bi-directional node 602 may be directly associated with the executable bi-directional node 602. In other words, the one or more connection links that provide the input to the executable bi-directional node 602 may be associated with the executable bi-directional node 602 without being associated with the inward group object 622. In such embodiments, the functionalities of the one or more overlay nodes associated with the inward group object 622 may not be executed on the input received via the one or more connection links that are not associated with the inward group object 622.

The input received by the executable bi-directional node 602 may act as a stimulus (for example, the stimulus 230). Based on the stimulus, the processing logic (for example, the controller module 206, the transaction module 208, or the like) may identify, from the plurality of executable bi-directional nodes, the executable bi-directional node 602 required to execute an operation associated with the stimulus. Based on the identification of the executable bi-directional node 602, the processing logic (for example, the memory management module 218 and the storage management module 220) may be configured to determine the connection link 616, including the OCO 618 and the ICO 620, coupled to the executable bi-directional node 602. The OCO 618 of the connection link may define association with the executable bi-directional node 602 by way of the primary role. Additionally, the ICO 620 of the connection link may define association with the executable bi-directional node 604 by way of the secondary role. As mentioned previously, the ICO 620 of the connection link 616 is associated with the executable bi-directional node 604. Therefore, based on the connection link 616, the processing logic (for example, the memory management module 218 and the storage management module 220) may be configured to identify the executable bi-directional node 604. In an instance, the executable bi-directional nodes 602 and 604 may not be loaded in the executable graph-based model 100. In such an instance, the processing logic (such as, the memory management module 218 and the storage management module 220) may be configured to load the executable bi-directional nodes 602 and 604 in the executable graph-based model 100 prior to utilization thereof for executing the operation associated with the stimulus.

Subsequently, the processing logic (for example, the controller module 206, the transaction module 208, or the like) may execute the operation associated with the stimulus based on the executable bi-directional nodes 602 and 604 and the connection link 616. It is assumed that the operation associated with the stimulus may be communication of a message (for example, a signal, an event, a query, a command, an instruction, or the like) from the executable bi-directional node 602 and the executable bi-directional node 604.

For execution of the operation associated with the stimulus, the processing logic (for example, the controller module 206, the transaction module 208, or the like) may use the executable bi-directional node 602 to generate the message based on an execution of processing logic associated with the generic overlay node 610, the bi-directional overlay node 612, and the overlay node 614 associated with the bi-directional overlay node 612. In an embodiment, the processing logic (for example, the controller module 206, the transaction module 208, or the like) may be configured to identify the generic overlay node 610, the bi-directional overlay node 612, and the overlay node 614 associated with the executable bi-directional node 602 prior to their utilization. The message may be generated further based on the generic overlay node 610 and the bi-directional overlay node 612 associated with the executable bi-directional node 602. That is to say, the operation associated with the stimulus is executed further based on the generic overlay node 610, and the bi-directional overlay node 612 associated with the executable bi-directional node 602. The operation associated with the stimulus is executed further based on the overlay node 614 associated with the bi-directional overlay node 612.

For communication of the message to the executable bi-directional node 604, the message passes through an outward group object 624 associated with the executable bi-directional node 602. An outward group object is a logical part of an associated bi-directional node that communicates a message via outward connection objects of one or more connection links associated therewith. The outward group object 624 may be a divergence point for one or more OCOs of various connection links associated with the executable bi-directional node 602. For example, the connection link 616 and a connection link 626 may diverge from the outward group object 624. The connection link 626 may associate the executable bi-directional node 602 to the bi-directional node 606 such that the executable bi-directional node 602 may communicate one or more messages to the bi-directional node 606 via the outward group object 624.

At the outward group object 624, the processing logic (for example, the controller module 206, the transaction module 208, or the like) may execute the processing logic associated with the overlay node 614 on the message being communicated by the executable bi-directional node 602. Therefore, the operation associated with the stimulus may be executed further based on the outward group object 624 and the overlay node 614 associated therewith. Subsequently, the message may be communicated to the bi-directional nodes 604 and 606 via the connection links 616 and 626, respectively. In other words, the message being communicated via the outward group object 624 may be communicated to each bi-directional node that may be associated with the executable bi-directional node 602 via connection links with corresponding OCOs diverging from the outward group object 624. Therefore, the operation associated with the stimulus may be executed further based on the bi-directional node 606.

While being communicated to the executable bi-directional node 604, the message passes through the OCO 618. An OCO is depicted herein by way of a half-moon associated with a solid line and an ICO is depicted herein by way of an oval arrow. In addition, the half-moon enclosed within a circle indicates that the OCO 618 may be associated with an overlay (for example, a generic overlay node or a bi-directional overlay node). An oval arrowhead of the oval arrow enclosed within a circle indicates that the ICO 620 may be associated with an overlay node (for example, a generic overlay node or a bi-directional overlay node).

As shown, the OCO 618 is associated with an overlay node 628. The overlay node 628 may be a bi-directional overlay node or a generic overlay node. At the OCO 618, the processing logic (for example, the controller module 206, the transaction module 208, or the like) may execute processing logic associated with the overlay node 628 on the message received from the outward group object 624. Therefore, the operation associated with the stimulus is executed further based on the overlay node 628. Subsequently, the message passes through the ICO 620. The ICO 620 is associated with an overlay node 630. The overlay node 630 may be a bi-directional overlay node or a generic overlay node. At the ICO 620, the processing logic (for example, the controller module 206, the transaction module 208, or the like) may execute processing logic associated with the overlay node 630 on the message received from the OCO

618. Therefore, the operation associated with the stimulus is executed further based on the overlay node 630. In an embodiment, the processing logic (for example, the controller module 206, the transaction module 208, or the like) may be configured to identify the overlay nodes 628 and 630 associated with the OCO 618 and ICO 620, respectively, prior to their utilization.

Subsequently, the message is communicated to an inward group object 632. The inward group object 632 is a convergence point associated with the executable bi-directional node 604 for receiving inputs from the executable bi-directional node 602 and the bi-directional node 608. At the inward group object 632, the processing logic (for example, the controller module 206, the transaction module 208, or the like) may execute processing logic associated with an overlay node 634 of the inward group object 632 on the message received from the ICO 620. The overlay node 634 may be a generic overlay node or a bi-directional overlay node. Therefore, the operation associated with the stimulus may be executed further based on the overlay node 634. In an embodiment, the processing logic (for example, the controller module 206, the transaction module 208, or the like) may be configured to identify the overlay node 634 associated with the inward group object 632 prior to its utilization.

Subsequently, the message may be communicated to the executable bi-directional node 604. At the executable bi-directional node 604, the processing logic (for example, the controller module 206, the transaction module 208, or the like) may execute processing logic associated with an overlay node 636 of the executable bi-directional node 604 on the message. The overlay node 636 may be a generic overlay node or a bi-directional overlay node. Therefore, the operation associated with the stimulus may be executed further based on the overlay node 636. In an embodiment, the processing logic (for example, the controller module 206, the transaction module 208, or the like) may be configured to identify the overlay node 636 associated with the executable bi-directional node 604 prior to its utilization. Based on the execution of the processing logic associated with the overlay node 636, the operation associated with the stimulus may be completed and a stimulus response may be generated by the executable bi-directional node 604. The stimulus response may be published using a publisher overlay node 638 associated with the executable bi-directional node 604.

In some embodiments, the executable bi-directional node 602 may be associated with a generic node 639. The executable bi-directional node 602 having an edge node-type may include a role A associated with the generic node 639. The role A may be indicative of a capacity in which the generic node 639 may be associated with the executable bi-directional node 602. The processing logic (for example, the controller module 206 or the transaction module 208) may be configured to identify the generic node 639 based on the association thereof with the executable bi-directional node 602. The processing logic (for example, the controller module 206 or the transaction module 208) may be further configured to communicate the message to the generic node 639. Therefore, the operation associated with the stimulus may be executed further based on the generic node 639.

In some embodiments, the executable bi-directional node 602 may include an overlay manager (for example, the overlay manager 416 depicted in FIG. 4B). The overlay manager may maintain a ledger (for example, the overlay ledger 418) associated with the executable bi-directional node 602. The ledger may include functionalities of the generic overlay node 610 and the bi-directional overlay node

612. The processing logic (for example, the overlay management module 236) may be configured to trigger, based on the stimulus, the generic overlay node 610 and/or the bi-directional overlay node 612.

It will be apparent to a person skilled in the art that a message being executed between two bi-directional nodes (for example, the executable bi-directional nodes 602 and 604) passes through various junctures (for example, the bi-directional node 602, the outward group object 624, the OCO 618, the ICO 620, the inward group object 632, and the executable bi-directional node 604) in a sequential manner. At each juncture, in case one or more associated overlay nodes (for example, a generic overlay node and/or a bi-directional overlay node) are present, the processing logic of each overlay node is executed on the message and a modified message is transmitted to the next juncture.

The operation associated with the stimulus may be executed further based on nodes associated with the executable bi-directional node 602 via the connection links associated with the inward group object 622 and the bi-directional nodes 606 and 608 without deviating from the scope of the disclosure. The executable bi-directional node 602 may use the inward group object 622 to communicate with the nodes associated therewith via the inward group object 622. Similarly, the executable bi-directional node 602 may communicate with the bi-directional node 606 via the outward group object 624. The executable bi-directional node 602 may receive an input from the bi-directional node 608 via the inward group object 632.

In some embodiments, the executable bi-directional node 602 may be a stateless node or a stateful node. In an instance, when the executable bi-directional node 602 may be the stateless node, the executable bi-directional node 602 may be non-persistent and may cease to exist based on its unloading from the executable graph-based model 100. Therefore, data and processing logic associated with the executable graph-based model 100 may have to be re-generated based on a requirement thereof. In another instance, when the executable bi-directional node 602 may be the stateful node, the executable bi-directional node 602 may be persistent and may be loaded in the executable graph-based model 100 based on a requirement thereof.

Although not shown, the executable bi-directional node 604 may have an outward group object via which the executable bi-directional node 604 may be associated with two or more bi-directional nodes. In some embodiments, the processing logic (for example, the controller module 206 and the transaction module 208) may execute the operation associated with the stimulus further based on the two or more bi-directional nodes associated with the executable bi-directional node 604 via the outward group object. The executable bi-directional node 604 may communicate with the two or more bi-directional nodes via the outward group object.

It will be apparent to a person skilled in the art that each bi-directional node that may be required to process the stimulus may have to be loaded in the executable graph-based model 100. In some embodiments, the OCO 618 and/or the ICO 620 may be further associated with a set of attributes (not shown). The set of attributes may be indicative of a loading strategy associated with the executable bi-directional node 602 and/or the executable bi-directional node 604. In an instance, one or more attributes of the set of attributes that may be associated with the OCO 618 may be indicative of the loading strategy of the executable bi-directional node 602. Similarly, one or more attributes of the set of attributes that may be associated with the ICO 620 may be indicative of the loading strategy of the executable bi-directional node 604. The loading strategy may be an eager loading strategy or a lazy loading strategy. When loaded using the eager loading strategy, an executable bi-directional node may be loaded proactively and hence is loaded prior to a time instance of its use. When loaded using the lazy loading strategy, the loading of an executable bi-directional node may be deferred until a time instance of its use. In other words, the executable bi-directional node when loaded using the lazy loading strategy may be loaded based on a requirement thereof. The set of attributes may be accessed by the processing circuitry (for example, the controller module 206 and the transaction module 208) of the overlay system 202 while processing manifests of the executable bi-directional nodes.

For the sake of brevity, the connection link 616 is assumed to be the node with the role node-type. In other embodiments, the connection link 616 may be implemented as roles that are integral to the bi-directional nodes 602 and 604 which are bi-directional nodes with the edge node-type 362. In other words, the primary role may be realized by the executable bi-directional node 602 and the secondary role may be realized as part of the executable bi-directional node 604 without deviating from the scope of the disclosure. In such embodiments, the OCO 618 and the ICO 620 of the connection link 616 may not be associated with any overlay nodes.

It will be apparent to a person skilled in the art that operations being performed by a node of the executable graph-based model 100 are realized by the processing logic (for example, the controller module 206, the transaction module 208, or any other component of the overlay system 202) while using relevant nodes.

For the sake of brevity, a single communication link (for example, the connection link 616) is shown between the executable bi-directional nodes 602 and 604. The connection link 616 allows the executable bi-directional node 602 to communicate with the executable bi-directional node 604. For the executable bi-directional node 604 to be able to communicate with the executable bi-directional node 602, another communication link (not shown) may be instantiated between the executable bi-directional nodes 602 and 604 such that an ICO may be associated with the executable bi-directional node 602 and an OCO may be associated with the executable bi-directional node 604.

Figure 7A:
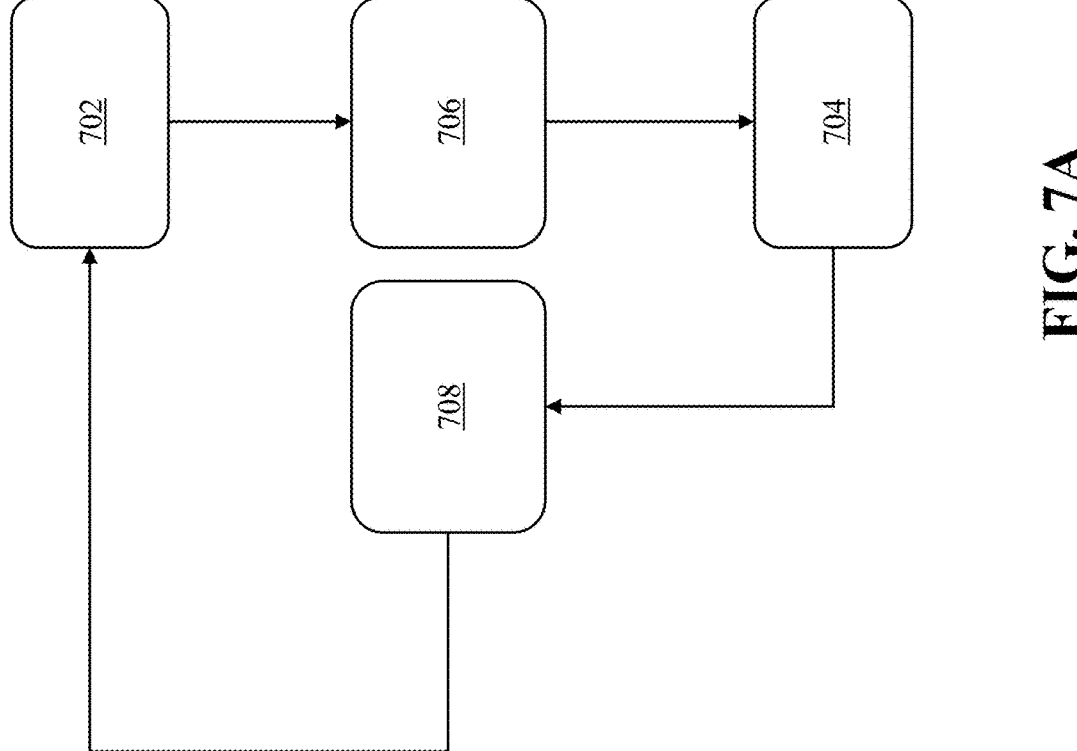
FIGS. 7A and 7B are block diagrams that, collectively, illustrate a process of loading bi-directional nodes, in accordance with an embodiment of the present disclosure.
Figure 7A:
Figure 7B:
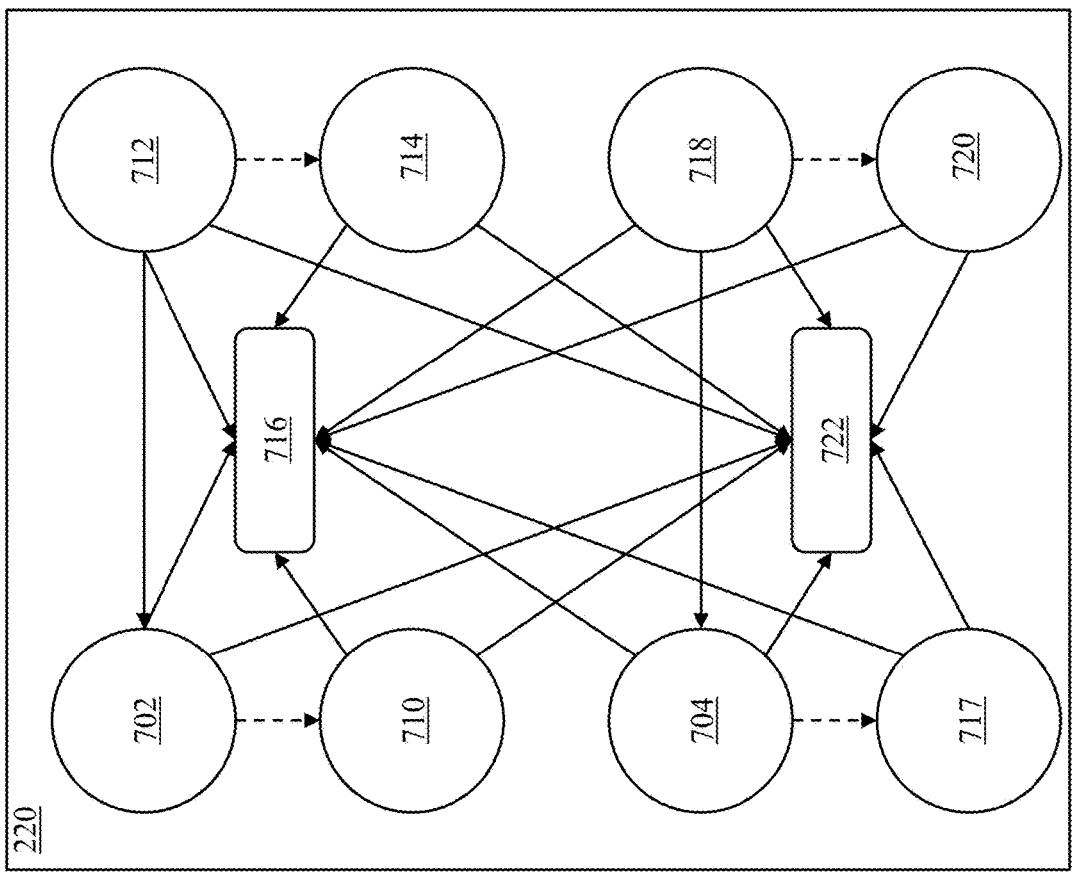

To summarize, FIG. 6 describes an operation associated with stimulus processing using the bi-directional nodes in the executable graph-based model 100. As mentioned earlier, prior to execution of the operation associated with the stimulus, relevant nodes are required to be loaded in the executable graph-based model 100. FIGS. 7A and 7B, collectively, illustrate a process of loading of bi-directional nodes required for processing of the stimulus (for example, the stimulus 230).

FIGS. 7A and 7B are block diagrams 700A and 700B that, collectively, illustrate a process of loading bi-directional nodes, consistent with disclosed embodiments of the present disclosure. Referring to FIG. 7A, shown are bi-directional nodes 702 and 704 coupled by way of a connection link 706 that enables the bi-directional node 702 to transmit messages to the bi-directional node 704. The bi-directional nodes 702 and 704 are further associated with a connection link 708 that enables the bi-directional node 704 to transmit messages to the bi-directional node 702. In an instance, when the bi-directional nodes 702 and 704 may not be used by the processing logic (for example, the controller module 206 and the transaction module 208) for any operation associated with the overlay system 202, the bi-directional nodes 702 and 704 may be unloaded from the executable graph-based model 100. In a subsequent instance, the processing logic (for example, the controller module 206 and the transaction module 208) may require the use of the bi-directional node 702. Therefore, the processing logic (for example, the memory management module 218 and the storage management module 220) may load the bi-directional node 702. Based on the association with the bi-directional node 702, the bi-directional node 704 may also be loaded in the executable graph-based model 100.

Referring to FIG. 7B, shown is the storage management module 220 of the overlay system 202 that along with the processing logic (for example, the controller module 206 and the transaction module 208) and the memory management module 218 manage storage, loading, and unloading of the bi-directional nodes of the executable graph-based model 100. As shown, the bi-directional node 702 has a bi-directional node state 710. The bi-directional node state 710 has a bi-directional node manifest 712 that has a bi-directional node manifest state 714. The bi-directional node state 710 has a description that is similar to the second state 506 of the base node 302 of FIG. 5. The bi-directional node manifest 712 has a description that is similar to the second manifest 516 of FIG. 5. The bi-directional node manifest state 714 has a description that is similar to description of the manifest state of the second manifest 516 of FIG. 5. In addition, the bi-directional node 702, the bi-directional node state 710, the bi-directional node manifest 712, and the bi-directional node manifest state 714 are associated with an identifier 716.

Similarly, the bi-directional node 704 has a bi-directional node state 717. The bi-directional node state 717 has a bi-directional node manifest 718 that has a bi-directional node manifest state 720. The bi-directional node state 717 has a description that is similar to the second state 506 of the base node 302 of FIG. 5. The bi-directional node manifest 718 has a description that is similar to the second manifest 516 of FIG. 5. The bi-directional node manifest state 720 has a description that is similar to the description of the manifest state of the second manifest 516 of FIG. 5. In addition, the bi-directional node 704, the bi-directional node state 717, the bi-directional node manifest 718, and the bi-directional node manifest state 720 are associated with an identifier 722.

Notably, the bi-directional node 702, the bi-directional node state 710, the bi-directional node manifest 712, and the bi-directional manifest state 714 are associated with the identifier 722. In addition, the bi-directional node 704, the bi-directional node state 717, the bi-directional node manifest 718, and the bi-directional node manifest state 720 are associated with the identifier 716.

It will be apparent to a person skilled in the art that a bi-directional node may be loaded in a manner that is similar to the loading of the base node 302. Notably, an executable bi-directional node may be loaded in a manner that is similar to the loading of the executable generic node 402.

While loading the bi-directional node 702, the processing logic (for example, the controller module 206 and the transaction module 208) may determine the identifier 722 associated with the bi-directional node 702. Based on the determination of the identifier 722, the processing logic (for example, the controller module 206 and the transaction module 208) may further load the bi-directional node 704 in a manner that is similar to the loading of the bi-directional node 702. Similarly, in other embodiments, while loading the bi-directional node 704, the processing circuitry (for example, the memory management module 218 and the storage management module 220) may load the bi-directional node 702.

To summarize, based on reception of a stimulus associated with the bi-directional node 702, the bi-directional node 702, the connection link 706, the bi-directional node 704, and overlay nodes associated with them may be loaded.

It will be apparent to a person skilled in the art that based on the connection link 708 connecting the bi-directional node 704 to the bi-directional node 702, the bi-directional node 702 may be loaded in an instance when the bi-directional node 704 is loaded.

In some embodiments, a bi-directional node may inherit data and processing logic associated with one or more generic nodes or one or more bi-directional nodes. Based on the loading of the bi-directional node, the one or more generic nodes or one or more bi-directional nodes may also be loaded.

In some embodiments, a bi-directional node may have a dependency with one or more generic nodes or the one or more bi-directional nodes. Based on the loading of the bi-directional node, the one or more generic nodes or one or more bi-directional nodes may also be loaded.

In some embodiments, a bi-directional node may be associated with a bi-directional overlay node via a connection link. Based on the loading of the bi-directional node, the bi-directional overlay node may also be loaded.

In some embodiments, when the execution of the stimulus processing of the stimulus is completed, the bi-directional nodes 702 and 704, the connection link 706, and overlay nodes associated therewith may be unloaded.

In some embodiments, a bi-directional node may inherit data and processing logic associated with one or more generic nodes or one or more bi-directional nodes. Based on an unloading of the bi-directional node, the one or more generic nodes or one or more bi-directional nodes may also be unloaded.

In some embodiments, a bi-directional node may have a dependency with one or more generic nodes or the one or more bi-directional nodes. Based on an unloading of the bi-directional node, the one or more generic nodes or one or more bi-directional nodes may also be unloaded.

In some embodiments, a bi-directional node may be associated with a bi-directional overlay node via a connection link. Based on an unloading of the bi-directional node, the bi-directional overlay node may also be unloaded.

In some embodiments, the bi-directional node 702 may have the share-shared dependency with the bi-directional node 704. The bi-directional node 704 may have a list with entries of bi-directional nodes currently using data and processing logic associated therewith. In such embodiments, in case a count of entries in the list is non-zero, the bi-directional node 704 may not be unloaded based on an unloading of the bi-directional node 702.

Having discussed the primary features of bi-directional nodes, the description now moves towards the discussion of additional features associated with the bi-directional nodes in the executable graph-based model 100.

Figure 8:
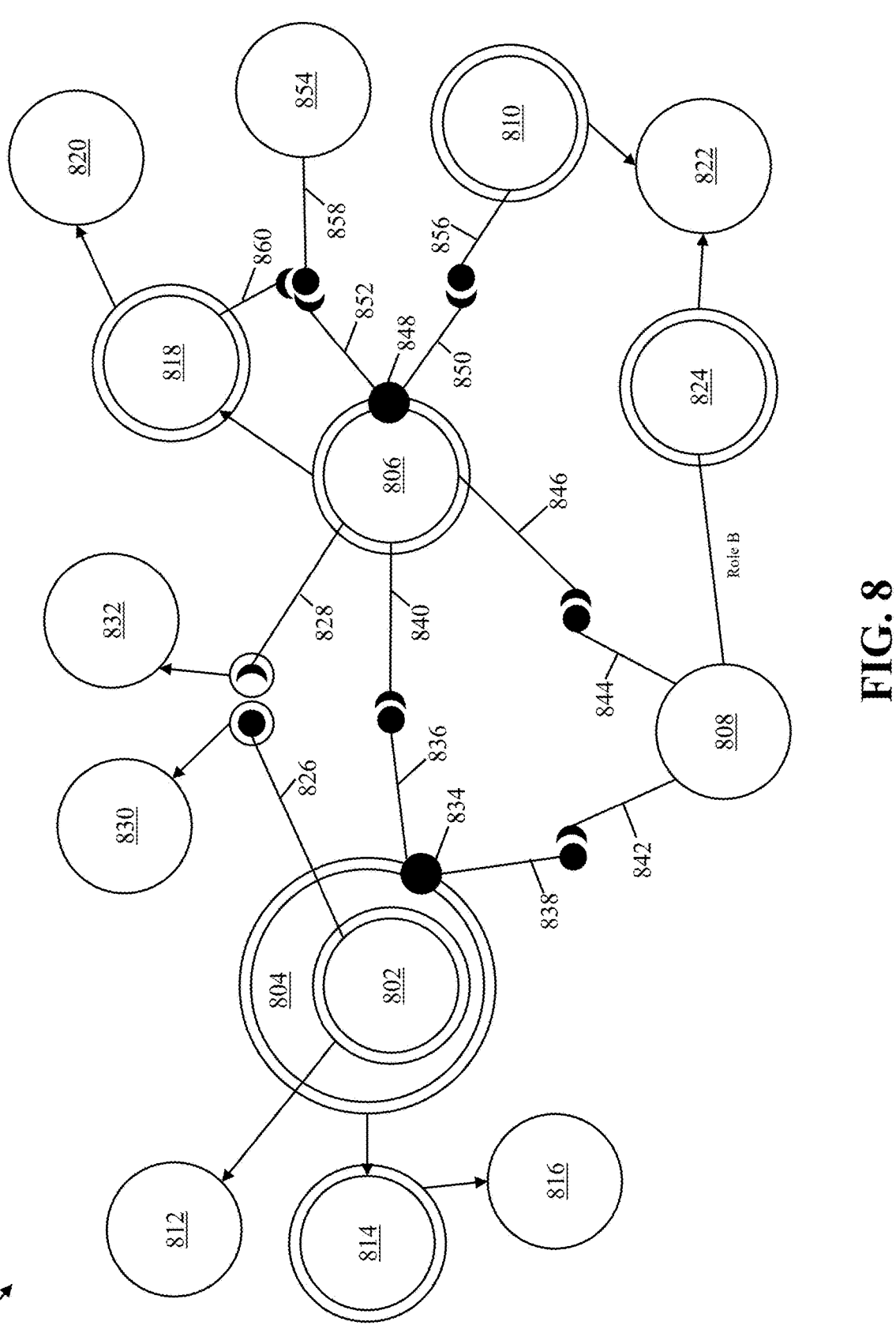
FIG. 8 illustrates a block diagram that depicts a plurality of bi-directional nodes in the executable graph-based model, consistent with disclosed embodiments of the present disclosure.

FIG. 8 illustrates a block diagram 800 that depicts a plurality of bi-directional nodes in the executable graph-based model 100, consistent with disclosed embodiments of the present disclosure. Referring to FIG. 8, shown is a plurality of bi-directional nodes including bi-directional nodes 802 through 810.

As shown, the bi-directional node 802 (hereinafter, the executable bi-directional node 802) is extended by way of a generic overlay node 812 whereas the bi-directional node 804 (hereinafter, the executable bi-directional node 804) is extended by way of another generic overlay node 814 that is further extended by way of a generic overlay node 816. The executable bi-directional node 802 is shown to be enclosed within the executable bi-directional node 804. This indicates that the executable bi-directional node 804 inherits the executable bi-directional node 802. Therefore, data and processing logic associated with the executable bi-directional node 802 and the overlay nodes (for example, the generic overlay node 812) of the executable bi-directional node 802 are inherited by the executable bi-directional node 804. In addition, dependency, inherited data and processing logic, and associations with other nodes, of the executable bi-directional node 802 are also inherited by the executable bi-directional node 804.

The bi-directional node 806 (hereinafter, the executable bi-directional node 806) is extended by way of a bi-directional overlay node 818 that is further extended by way of an overlay node 820. The overlay node 820 may be a generic overlay node or a bi-directional overlay node. The bi-directional node 810 (hereinafter, the executable bi-directional node 810) is shown to be extended by way of a generic overlay node 822. The executable graph-based model 100 further depicts a generic node 824 (namely, an executable generic node 824) that is extended by way of the generic overlay node 822. As shown, the generic overlay node 822 is being shared by the executable bi-directional node 810 and the executable generic node 824.

The executable bi-directional node 802 is associated with the executable bi-directional node 806 by way of a connection link that includes an ICO 826 and an OCO 828. The ICO 826 is coupled with the executable bi-directional node 802 and the OCO 828 is coupled with the executable bi-directional node 806. The ICO 826 is associated with a dependency indicator 'SHARED' that is indicative of a dependency between the executable bi-directional nodes 802 and 806. The ICO 826 is further associated with a communication direction 'IN' that is indicative of a direction of flow of a transaction associated with the transmission of the message between the executable bi-directional nodes 802 and 806. Further, the OCO 828 is associated with a dependency indicator 'SHARE' that is indicative of the dependency between the executable bi-directional nodes 802 and 806. The OCO 828 is further associated with a communication direction 'OUT' that is indicative of the direction of flow of the transaction associated with the transmission of the message between the executable bi-directional nodes 802 and 806.

The OCO 828 is also associated with a node identifier associated with the executable bi-directional node 802 to which the executable bi-directional node 806 may transmit messages using the connection link including the ICO 826 and the OCO 828. This is indicative of a dependency between the executable bi-directional nodes 802 and 806 being share-shared dependency and the executable bi-directional node 806 being able to transmit messages (for example, commands, events, queries, signals, instructions, or the like) to the executable bi-directional node 802. Moreover, the connection link between the executable bi-directional nodes 802 and 806 is implemented as a bi-directional node with role node-type. Therefore, the ICO 826 is extended by way of a generic overlay node 830 and the OCO 828 is extended by way of a bi-directional overlay node 832. In an instance, a message is communicated by the executable bi-directional node 806 to the executable bi-directional node 802. In such an instance, the message is generated by the executable bi-directional node 806 and transmitted to the executable bi-directional node 802 by way of the OCO 828 and the ICO 826. The message transmitted by the executable bi-directional node 806 passes through the OCO 828, where processing logic associated with the bi-directional overlay node 832 is executed on the message. Subsequently, the message passes through the ICO 826, where processing logic associated with the generic overlay node 830 is executed on the message. Subsequently, the message is received by the executable bi-directional node 802, where processing logic associated with the generic overlay node 812 is executed on the message.

As shown, the executable bi-directional node 804 is associated with the executable bi-directional node 806 and the bi-directional node 808 via an inward group object 834. Further, ICOs 836 and 838 converge at the inward group object 834. In an embodiment, when an overlay node is associated with the inward group object 834, processing logic associated with the inward group object 834 may be executed either collectively on inputs received from the executable bi-directional node 806 and the bi-directional node 808 or separately on an input received from each of the executable bi-directional nodes 806 and the bi-directional node 808.

The executable bi-directional node 804 is associated with the executable bi-directional node 806 by way of a connection link that includes the ICO 836 and an OCO 840. The ICO 836 is coupled with the executable bi-directional node 804 and the OCO 840 is coupled with the executable bi-directional node 806. Notably, an ICO is associated with a first dependency indicator, a first communication direction, and a first node identifier of a node from which an associated node may receive one or more messages. Similarly, an OCO is associated with a second dependency indicator, a second communication direction, and a second node identifier of a node to which an associated node may communicate one or more messages. The first and second dependency indicators may, collectively, indicate a dependency between nodes associated with the ICO and OCO. The first communication direction and the second communication direction may, collectively, indicate a direction of flow of transmission of messages between the nodes associated with the ICO and OCO. The ICO 836 is associated with a first dependency indicator 'SHARED', a first communication direction 'IN', and a first node identifier of the executable bi-directional node 806. The OCO 840 is associated with a second dependency indicator 'SHARE', a second communication direction 'OUT', and a second node identifier of the executable bi-directional node 804. The first and second dependency indicators 'SHARED' and 'SHARE', respectively, indicate that a dependency between the executable bi-directional nodes 804 and 806 is the share-shared dependency. The first and second communication directions are, collectively, indicative of the direction of flow of transmission of messages between the executable bi-directional nodes 804 and 806 being from the executable bi-directional node 806 to the executable bi-directional node 804. The first and second node identifiers indicate that the executable bi-directional nodes 804 and 806 associated with the ICO 836 and OCO 840, respectively, communicate with each other. This is indicative of the executable bi-directional node 806 being able to transmit messages (for example, commands, events, queries, signals, instructions, or the like) to the executable bi-directional node 804. Moreover, the connection link between the executable bi-directional nodes 804 and 806 is implemented as a non-node structure of the executable graph-based model 100. Hence, the ICO 836 and the OCO 840 may not be extended by way of an overlay node.

The executable bi-directional node 804 is further associated with the bi-directional node 808 by way of a connection link that includes the ICO 838 and an OCO 842. The ICO 838 is coupled with the executable bi-directional node 804 and the OCO 842 is coupled with the bi-directional node 808. The ICO 838 is associated with a first dependency indicator 'SHARED', a first communication direction 'IN', and a first node identifier of the executable bi-directional node 808. Further, the OCO 842 is associated with a second dependency indicator 'SHARE', a communication direction 'OUT', and a second node identifier of the executable bi-directional node 804. The first and second dependency indicators 'SHARED' and 'SHARE', respectively, indicate that a dependency between the executable bi-directional nodes 804 and 808 is the share-shared dependency. The first and second communication directions are, collectively, indicative of the direction of flow of transmission of messages between the executable bi-directional nodes 804 and 808 being from the executable bi-directional node 808 to the executable bi-directional node 804. The first and second node identifiers indicate that the executable bi-directional nodes 804 and 808 associated with the ICO 838 and OCO 842, respectively, communicate with each other. This is indicative of the executable bi-directional node 808 being able to transmit messages (for example, commands, events, queries, signals, instructions, or the like) to the executable bi-directional node 804. Moreover, the connection link between the executable bi-directional nodes 804 and 808 is implemented as a non-node structure of the executable graph-based model 100. Hence, the ICO 836 and the OCO 840 may not be extended by way of an overlay node.

The bi-directional node 808 is further associated with the executable bi-directional node 806 by way of a connection link that includes an ICO 844 and an OCO 846. The ICO 844 is coupled with the bi-directional node 808 and the OCO 846 is coupled with the executable bi-directional node 806. The ICO 844 is associated with a dependency indicator 'USED' that is indicative of a dependency between the executable bi-directional node 806 and the bi-directional node 808. The ICO 844 is further associated with a communication direction 'IN' that is indicative of a direction of flow of a transaction associated with transmission of a message between the executable bi-directional node 806 and the bi-directional node 808. The ICO 844 is also associated with a node identifier associated with the executable bi-directional node 806 from which the bi-directional node 808 may receive messages using the connection link including the ICO 844 and the OCO 846. Further, the ICO 844 is associated with a dependency indicator 'USED' that is indicative of the dependency between the executable bi-directional node 806 and the bi-directional node 808. This is indicative of a dependency between the executable bi-directional node 806 and the bi-directional node 808 being a use-used dependency. The ICO 844 is further associated with a communication direction 'IN' that is indicative of the direction of flow of the transaction associated with the transmission of the message between the executable bi-directional node 806 and the bi-directional node 808. The OCO 846 is also associated with a node identifier associated with the bi-directional node 808 to which the bi-directional node 808 may transmit messages using the connection link including the ICO 844 and the OCO 846. This is indicative of the executable bi-directional node 806 being able to transmit messages (for example, commands, events, queries, signals, instructions, or the like) to the bi-directional node 808. Moreover, the connection link between the executable bi-directional nodes 806 and 808 is implemented as bi-directional nodes with role node-type. Hence, in other embodiments, the ICO 844 and the OCO 846 may be extended by way of one or more overlay nodes.

The bi-directional node 808 is further associated with the executable generic node 824 by way of a role (for example, Role B). The bi-directional node 808 with the edge node-type may be directly associated with the executable generic node 824 by way of the role A. Consequently, the bi-directional node 808 may directly communicate with the executable generic node 824 without requiring a connecting link therebetween. As the executable generic node 824 is extended by way of the generic overlay node 822, a message received by the executable generic node 824 from the bi-directional node 808 may be modified based on an execution of processing logic associated with the generic overlay node 822.

As shown, the executable bi-directional node 806 has an outward group object 848 from which OCOs 850 and 852 of connection links that couple the executable bi-directional node 806 with the executable bi-directional node 810 and the bi-directional overlay node 854, respectively. The executable bi-directional node 806 is further associated with the executable bi-directional node 810 by way of a connection link that includes the OCO 850 and an ICO 856. The ICO 856 is coupled with the executable bi-directional node 810 and the OCO 850 is coupled with the bi-directional node 806. The ICO 856 is associated with a dependency indicator 'OWNED' that is indicative of a dependency between the executable bi-directional nodes 806 and 810. The ICO 856 is further associated with a communication direction 'IN' that is indicative of a direction of flow of a transaction associated with transmission of a message between the executable bi-directional nodes 806 and 810. Further, the OCO 850 is associated with a dependency indicator 'OWN' that is indicative of the dependency between the executable bi-directional nodes 806 and 810. This is indicative of a dependency between the executable bi-directional nodes 806 and 810 being own-owned dependency such that the executable bi-directional node 806 owns the executable bi-directional node 810. The OCO 850 is further associated with a communication direction 'OUT' that is indicative of the direction of flow of the transaction associated with the transmission of the message between the executable bi-directional nodes 806 and 810. The OCO 850 is also associated with a node identifier associated with the executable bi-directional node 810 to which the executable bi-directional node 806 may transmit messages using the connection link including the ICO 856 and the OCO 850. This is indicative of the executable bi-directional node 806 being able to transmit messages (for example, commands, events, queries, signals, instructions, or the like) to the executable bi-directional node 810. Moreover, the connection link between the executable bi-directional nodes 806 and 810 is implemented as a non-node structure of the executable graph-based model 100. Hence, the ICO 856 and the OCO 850 may not be extended by way of one or more overlay nodes.

The executable bi-directional node 806 is further associated with the bi-directional overlay node 854 by way of a connection link that includes the OCO 852 and an ICO 858. As shown, the OCO 852 is coupled with the bi-directional node 806 and the ICO 858 is coupled with the bi-directional overlay node 854. The ICO 858 is associated with a dependency indicator 'SHARED' that is indicative of a dependency between the executable bi-directional node 806 and the bi-directional overlay node 854. The ICO 858 is further associated with a communication direction 'IN' that is indicative of a direction of flow of a transaction associated with transmission of a message between the executable bi-directional node 806 and the bi-directional overlay node 854. Further, the OCO 852 is associated with a dependency indicator 'SHARE' that is indicative of the dependency between the executable bi-directional node 806 and the bi-directional overlay node 854. This is indicative of a dependency between the executable bi-directional node 806 and the bi-directional overlay node 854 being share-shared dependency such that the executable bi-directional node 806 uses the bi-directional overlay node 854 while sharing with one or more other bi-directional nodes (for example, the bi-directional overlay node 818). The OCO 852 is further associated with a communication direction 'OUT' that is indicative of the direction of flow of the transaction associated with the transmission of the message between the executable bi-directional node 806 and the bi-directional overlay node 854. The OCO 852 is also associated with a node identifier associated with the bi-directional overlay node 854 to which the executable bi-directional node 806 may transmit messages using the connection link including the ICO 858 and the OCO 852. This is indicative of the executable bi-directional node 806 being able to transmit messages (for example, commands, events, queries, signals, instructions, or the like) to the bi-directional overlay node 854 in order to access the processing logic associated therewith.

The bi-directional overlay node 854 is further associated with the bi-directional overlay node 818 by way of a connection link that includes the ICO 858 and an OCO 860. The OCO 860 is associated with a dependency indicator 'SHARE' that is indicative of the dependency between the bi-directional overlay nodes 818 and 854. This is indicative of a dependency between the bi-directional overlay nodes 818 and 854 being share-shared dependency such that the bi-directional overlay node 818 shares the bi-directional overlay node 854 with the executable bi-directional node 806. The OCO 860 is further associated with a communication direction 'OUT' that is indicative of the direction of flow of the transaction associated with the transmission of the message between the bi-directional overlay nodes 818 and 854. The OCO 860 is also associated with a node identifier associated with the bi-directional overlay node 854 to which the bi-directional overlay node 818 may transmit messages using the connection link including the ICO 858 and the OCO 860.

FIG. 8 shows that the ICO 858 is a part of two connection links (for example, the connection link coupling the executable bi-directional node 806 and the bi-directional overlay node 854 and the connection link coupling the bi-directional overlay nodes 818 and 854. It will be appreciated by a person skilled in the art that an OCO may also be part of two or more connection links in a similar manner.

It will be apparent to a person skilled in the art that each bi-directional node and/or generic node shown in FIG. 8 may be identified by the processing circuitry (for example, the controller module 206 and the transaction module 208) prior to utilization thereof. The processing circuitry (for example, the controller module 206 and the transaction module 208) may identify each bi-directional node and/or generic node based on a stimulus or a connection link associated therewith. Additionally, the processing circuitry (for example, the controller module 206 and the transaction module 208) may be configured to identify one or more bi-directional overlay nodes and one or more generic overlay nodes associated with bi-directional nodes, generic nodes, ICOs, OCOs, inward group objects, and outward group objects, depicted in FIG. 8, prior to its utilization.

To summarize, FIG. 8 describes various features of the executable graph-based model 100 including generic nodes and bi-directional nodes. The description now moves towards a mathematical implementation of the features of the bi-directional nodes.

Figure 9:
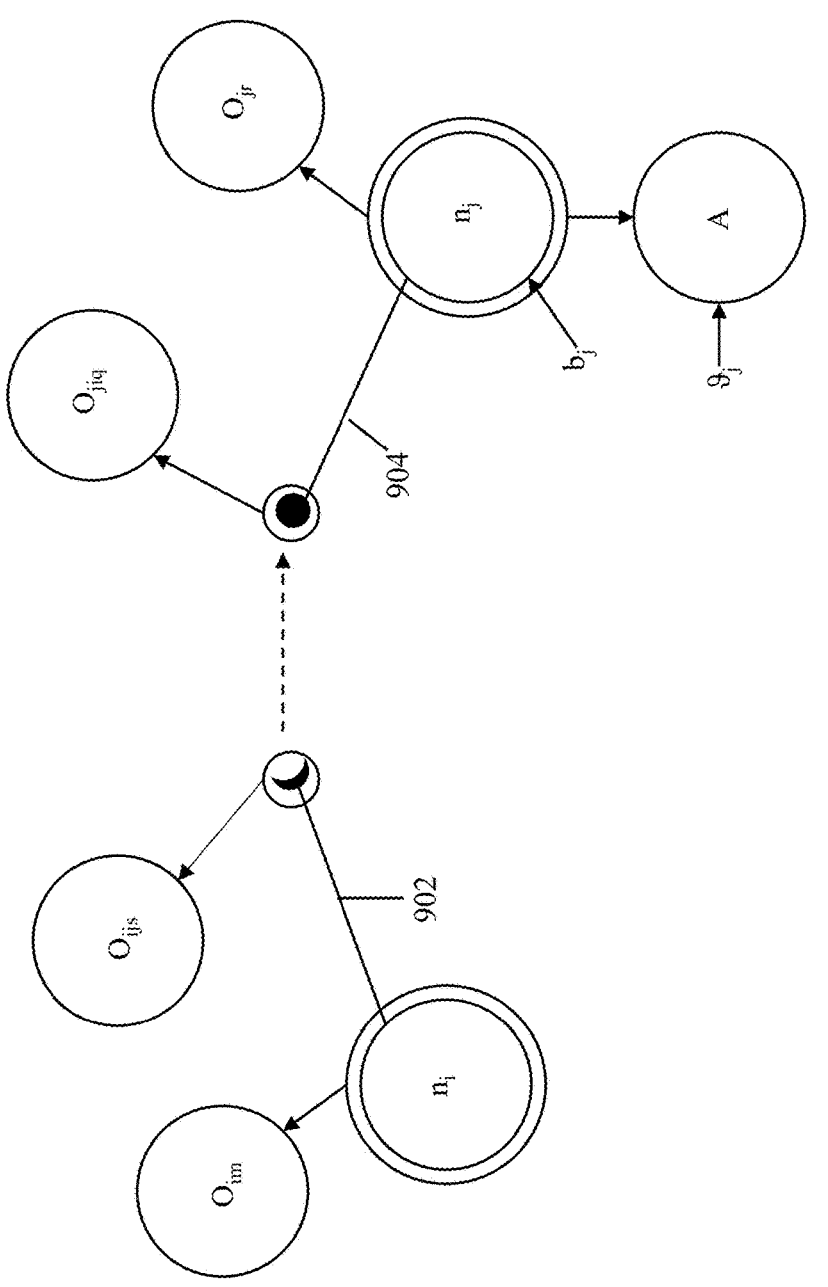
FIG. 9 illustrates a block diagram that depicts a mathematical representation of a neural network model that is implemented by way of the executable graph-based model, consistent with disclosed embodiments of the present disclosure.

FIG. 9 illustrates a block diagram that depicts a mathematical representation of a neural network model 900 that is implemented by way of the executable graph-based model 100, consistent with disclosed embodiments of the present disclosure. Referring to FIG. 9, the neural network model 900 includes an input layer including an executable bi-directional node $n_i$ and an output layer including an executable bi-directional node $n_j$, where 'i' is an index of nodes in the input layer and 'j' is an index of nodes in the output layer. For the sake of brevity, the executable bi-directional node $n_i$ in the input layer is shown to be associated with an OCO 902. Additionally, the executable bi-directional node $n_j$ in the output layer is shown to be associated with an ICO 904. In other embodiments, the input layer and the output layer may include any number of bi-directional nodes associated with OCOs and/or ICOs without deviating from the scope of the disclosure. Further, the neural network model 900 may include any number of hidden layers having any number of bi-directional nodes associated with ICOs and/or OCOs without deviating from the scope of the disclosure. As shown, nodes in the input layer are associated with nodes in the output layer by way of corresponding connection links such that ICOs of the connection links are associated with the bi-directional nodes in the input layer and the OCOs of the connection link are associated with the bi-directional nodes in the output layer. Thus, there may be i*j connection pairs between the input layer and the output layer. That is to say that the executable bi-directional node $n_i$ is associated with the executable bi-directional node $n_j$ by way of a connection link such that the executable bi-directional node $n_i$ is associated with an ICO 904 and the executable bi-directional node $n_j$ is associated with an OCO 902.

Moreover, bi-directional nodes in each layer may be extended by way of one or more overlay nodes (for example, generic overlay node or bi-directional overlay node). For example, the executable bi-directional nodes $n_i$ is extended by way of 'm' (m>0) overlay nodes $O_{im}$. Additionally, the executable bi-directional nodes $n_j$ is extended by way of 'r' (r>0) overlay nodes $O_{jr}$. The executable bi-directional node $n_i$ has the OCO 902 represented by $nc_{ij}$ that forms a connection pair with the ICO 904 associated with the executable bi-directional node $n_j$ and represented by $nc_{ji}$. The OCO 902 has $O_{ijs}$ overlay nodes associated therewith and the ICO 904 $O_{jiq}$ overlay nodes associated therewith.

Notably, processing logic associated with an overlay node of an executable bi-directional node is executed on messages going to any node associated with the executable bi-directional node. On the contrary, processing logic associated with an ICO or an OCO associated with a bi-directional node is executed only on messages passing via the said ICO or OCO.

In operation, a stimulus (for example, the stimulus 230) may be provided to the executable bi-directional node $n_i$ that may generate a signal with an initial state 'i' based on the stimulus 230. Further, the processing logic (for example, the controller module 206 or the transaction module 208) may execute the processing logic associated with the overlay nodes $O_{im}$ on the signal. Based on the execution, the executable bi-directional nodes $n_i$ may generate a first intermediate signal represented by $g_i(n_i)$, such that $$g_i(n_i)=(O_{i1} \cdot O_{i2} \cdot O_{i3} \cdot \ldots \ O_{im})(n_i)=(O_{i1}(O_{i2}(O_{i3}( \ldots (O_{im})(n_i))))) \tag{1}$$

where m is the number of overlays on $n_i$ and m>0; otherwise $g_i(n_i)=n_i$ where m=0

The processing logics of the overlay nodes $O_{im}$ are executed on the signal in an order represented by (1). In other words, the processing logics of the overlay nodes $O_{im}$ are executed such that processing logic of an overlay node with a higher index is executed prior to processing logic of an overlay node with a lower index number. In some embodiments, the processing logic of overlay nodes may be executed in a direction in the executable graph-based model 100 that follows a bottom-up approach. For example, the executable bi-directional node $n_i$ may be associated with a first overlay node that may be further associated with a second overlay node. In such an example, the processing logic associated with the second overlay node may be executed prior to the execution of the processing logic of the first overlay node.

Subsequently, the first intermediate signal passes through the OCO 902. At the OCO 902, the processing logic (for example, the controller module 206 or the transaction module 208) may execute processing logic associated with the overlay nodes $O_{ijs}$ on the first intermediate signal. Based on the execution of the processing logic of the overlay nodes $O_{ijs}$ on the first intermediate signal, a second intermediate signal represented by $V_{ij}$ may be generated, such that:

$$V_{ij}=h_{ij}(g_i(n_i)=(O_{ij1} \cdot O_{ij2} \cdot O_{ij3} \cdot \ldots \ O_{ijs})(g_i(n_i)=(O_{ij1}(O_{ij2}(O_{ij3}( \ldots (O_{ijs})(g_i(n_i)))))) \tag{2}$$

where s is the number of overlays on $nc_{ij}$ and s>0; otherwise $V_{ij}=g_i(n_i)$ where s=0.

At the OCO 902, the processing logic (for example, the controller module 206 or the transaction module 208) may execute the processing logic associated with the overlay nodes $O_{ijs}$ in a manner that is similar to the execution of the processing logic associated with the overlay nodes $O_{im}$. Subsequently, the second intermediate message represented by $V_{ij}$ is communicated to the ICO 904.

At ICO 904, the processing logic (for example, the controller module 206 or the transaction module 208) may execute processing logic associated with the overlay node $O_{jiq}$ on the second intermediate signal. Based on the execution of the processing logic associated with the overlay nodes $O_{jiq}$ a third intermediate signal represented by $k_{ji}(V_{ij})$ is generated such that:

$$(k_{ji}(V_{ij})=(O_{ji1} \cdot O_{ji2} \cdot O_{ji3} \cdot \ldots \ O_{jiq})(V_{ij}))=(O_{ji1}(O_{ji2}(O_{ji3}( \ldots (O_{jiq})(V_{ij})))) \tag{3}$$

where q is the number of overlays on $nc_{ji}$ and q>0; otherwise, $k_{ji}(V_{ij})=V_{ij}$ where q=0.

Subsequently, the third intermediate signal reaches the executable bi-directional node $n_j$. At the executable bi-directional node $n_j$, the processing logic (for example, the controller module 206 or the transaction module 208) may execute processing logic associated with the overlay nodes $O_{jr}$ on the third intermediate signal. Based on the execution of the processing logic associated with the overlay nodes $O_{jr}$, a fourth intermediate signal represented by $X_{ji}$ is generated such that:

$$X_{ji}=l_{ji}(k_{ji}(V_{ij})=(O_{j1} \cdot O_{j2} \cdot O_{j3} \cdot \ldots \ O_{jr})(k_{ji}(V_{ij}))=(O_{j1}(O_{j2}(O_{j3}( \ldots (O_{jr})(k_{ji}(V_{ij}))))) \tag{4}$$

where r is the number of overlays on $n_j$ and r>0 otherwise $X_{ji}=k_{ji}(V_{ij})$ where r=0.

Moreover, a weight defined as $W_{ji}$ is provided for the executable bi-directional node $n_j$. Based on the application of the weight $W_{ji}$ on the fourth intermediate signal, a final signal that represents a value of the executable bi-directional node $n_j$ is generated, such that $$n_j = b_j + \Sigma_{i=1} X_{ji} W_{ji}, \text{ where } b_j \text{ represents a bias.}$$

Subsequently, an activation function A with a threshold $9$; may be used to create the final signal. A final activation value for the executable bi-directional node is:

$$a_j = A(n_j)$$

It will be appreciated by a person skilled in the art that the bias weight and the activation function may be applied by way of one or more overlay nodes associated with the executable bi-directional node $n_j$. Beneficially, the use of overlay nodes for the application of processing logic allows for such applications to be tied to a context. The execution of the processing logic for modification of the signal may be associated with one or more contexts such that the processing logic is executed based on a match of context of the stimulus 230 with one of the set of defined contexts.

To summarize, the mathematical representation of the neural network model 900 provides a visual representation of a neural network and mathematical constructs may be derived from the neural network model 900. Additionally, such representation allows for a direct execution of overlay structure as defined by the executable graph-based model 100.

Having described various concepts associated with the perturbation of signals in the overlay structure 202, the description now moves towards a use case scenario associated with the overlay structure 202 described herein.

Figure 10:
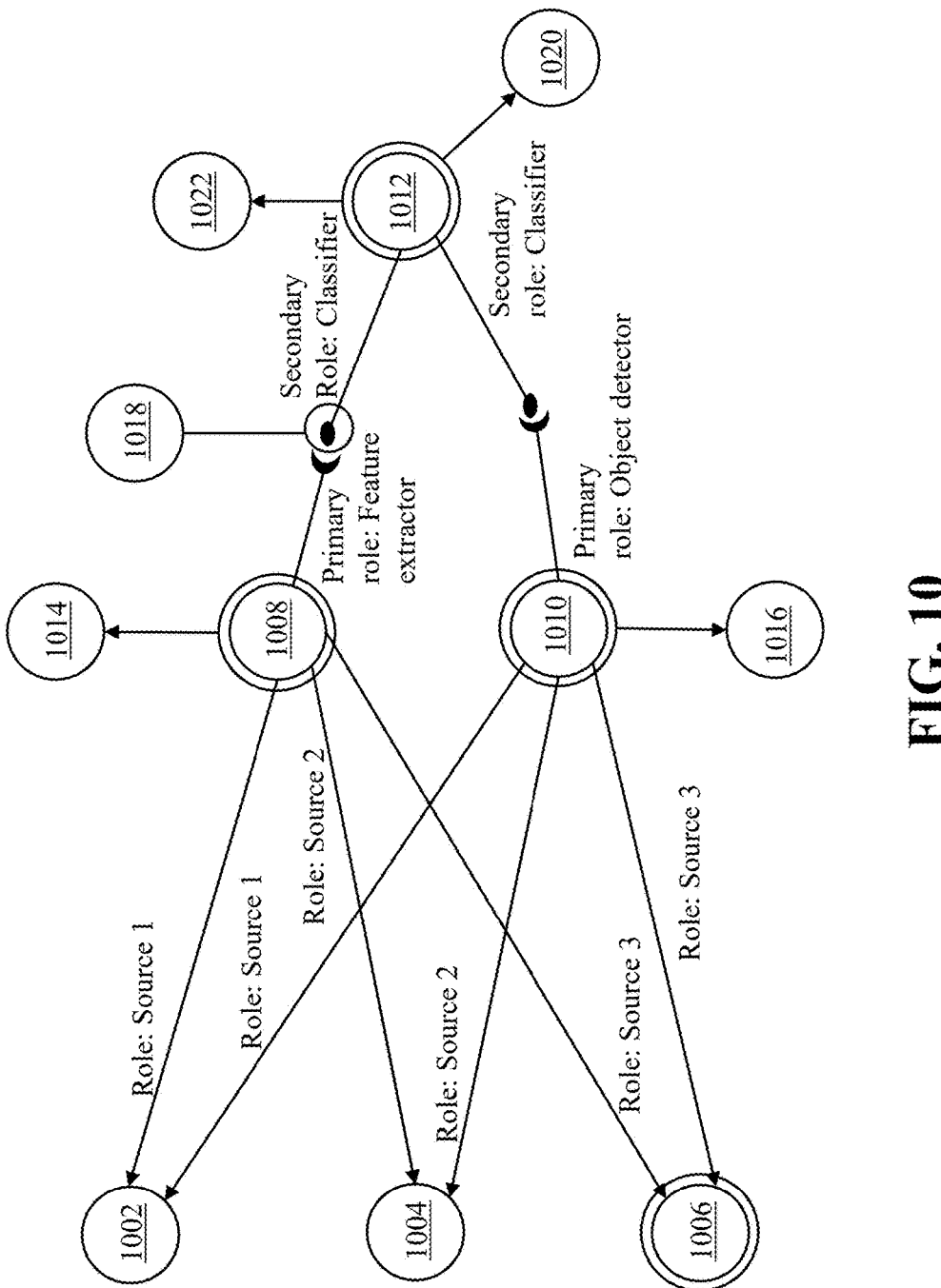
FIG. 10. is a block diagram that illustrates a neural network model for classification of images, consistent with disclosed embodiments of the present disclosure.

FIG. 10 is a block diagram that illustrates a neural network model 1000 for classification of images, consistent with disclosed embodiments of the present disclosure. Referring to FIG. 10, the neural network model 1000 includes an input layer, a hidden layer, and an output layer. The input layer includes a set of generic nodes 1002, 1004, and 1006, the hidden layer includes a first set of executable bi-directional nodes including executable bi-directional nodes 1008 and 1010, and the output layer includes a second set of executable bi-directional nodes including an execut-able bi-directional node 1012.

The set of generic nodes 1002, 1004, and 1006 may represent a set of pixels that form an image to be classified in one of a plurality of image classes. Each of the set of generic nodes 1002, 1004, and 1006 is associated with each of the first set of executable bi-directional nodes by way of a corresponding role. For example, the generic node 1002 is associated with each of the second set of executable bi-directional nodes by way of a role 'Source 1', the generic node 1004 is associated with each of the second set of executable bi-directional nodes by way of a role 'Source 2', and the generic node 1006 is associated with each of the second set of executable bi-directional nodes by way of a role 'Source 3'.

The executable bi-directional nodes 1008 and 1010 may acquire the set of pixels from the set of generic nodes 1002, 1004, and 1006. In an example, the executable bi-directional nodes 1008 and 1010 may acquire the set of pixels by executing a PULL operation. In some embodiments, the executable bi-directional nodes 1008 and 1010 may acquire the set of pixels based on the reception of a stimulus to classify an image. In other embodiments, the executable bi-directional nodes 1008 and 1010 may acquire the set of pixels based on a change in pixel values represented by the set of pixels.

The executable bi-directional node 1008 serves as a feature extractor and the executable bi-directional node 1010 serves as an object detector. The feature extractor extracts various features such as contrast, intensity, pixel value, luminosity, or the like associated with the pixels represented by the set of generic nodes. The object detector detects one or more objects depicted in the image formed by the set of pixels. The executable bi-directional nodes 1008 and 1010 are associated with the executable bi-directional node 1012 by way of a first connection link and a second connection link, respectively. The first connection link includes an OCO indicative of a primary role 'Feature extractor' associated with the executable bi-directional node 1008 and an ICO indicative of a secondary role 'Classifier' associated with the executable bi-directional node 1012. The second connection link includes an OCO indicative of a primary role 'Object detector' associated with the executable bi-directional node 1010 and an ICO indicative of a secondary role 'Classifier' associated with the executable bi-directional node 1012. The executable bi-directional node 1012 serves as a classifier and classifies the image into one or more of the plurality of classes.

In an instance, when the image formed by the set of pixels is to be classified, the processing logic (for example, the memory management module 218 and the storage management module 220) may load the set of generic nodes that represent the set of pixels. In addition, the processing circuitry (for example, the memory management module 218 and the storage management module 220) may load the first set of bi-directional nodes that may be required for classifying the image. Further, based on the first connection link coupling the executable bi-directional node 1008 with the executable bi-directional node 1012, the processing circuitry (for example, the memory management module 218 and the storage management module 220) may load the executable bi-directional node 1012. Further, based on the second connection link coupling the executable bi-directional node 1010 with the executable bi-directional node 1012, the processing logic (for example, the controller module 206 and the transaction module 208) may determine that the executable bi-directional node 1012 is already loaded in the executable graph-based model 100 and does not require to be loaded again.

Subsequently, pixel values of the set of pixels represented by the set of generic nodes are provided to each executable bi-directional node of the first set of executable bi-directional nodes. The executable bi-directional node 1008 may be associated with a bi-directional overlay node 1014 which includes processing logic, that when executed on the pixel values received by the executable bi-directional node 1008, extracts various features associated with each of the set of pixels based on pixel values therein. Moreover, the executable bi-directional node 1010 may be associated with a bi-directional overlay node 1016 which includes processing logic, that when executed on the set of pixels received by the executable bi-directional node 1010, identifies, based on the pixel values, one or more objects illustrated in the image.

The executable bi-directional node 1008 may communicate the extracted features to the executable bi-directional node 1012 via the first connection link. As shown, the ICO of the first connection link is associated with a bi-directional overlay node 1018 that may include a processing logic that when executed on the extracted features, may perform an amplification operation thereon. Additionally, the executable bi-directional node 1010 may communicate the detected objects to the executable bi-directional node 1012 via the second connection link. Further, as shown, the executable bi-directional node 1012 is associated with a bi-directional overlay node 1020. Upon reception of the extracted features and detected objects received by the executable bi-directional node 1012, the processing logic (for example, the controller module 206 and the transaction module 208) may execute the processing logic of the bi-directional overlay node 1020 on the extracted features and detected objects. Based on the execution, the image represented by the set of pixels may be classified into one or more classes of the plurality of classes. Subsequently, a publisher overlay node 1022, which is a generic overlay node associated with the executable bi-directional node 1012, may publish a classification of the image in one or more classes of the plurality of classes.

It will be apparent to a person skilled in the art that although a use case scenario for the overlay system 202 is described for an image classification model, implementations of the overlay system 202 are not limited to it. The overlay system 202 may also be implemented for applications in natural language processing, audio processing, robotics, database management, or the like.

Having discussed various concepts, operations, and usage associated with the overlay system 202, the description now moves towards a computing system for implementing the overlay system 202 that incorporates bi-directional nodes.

Figure 11:
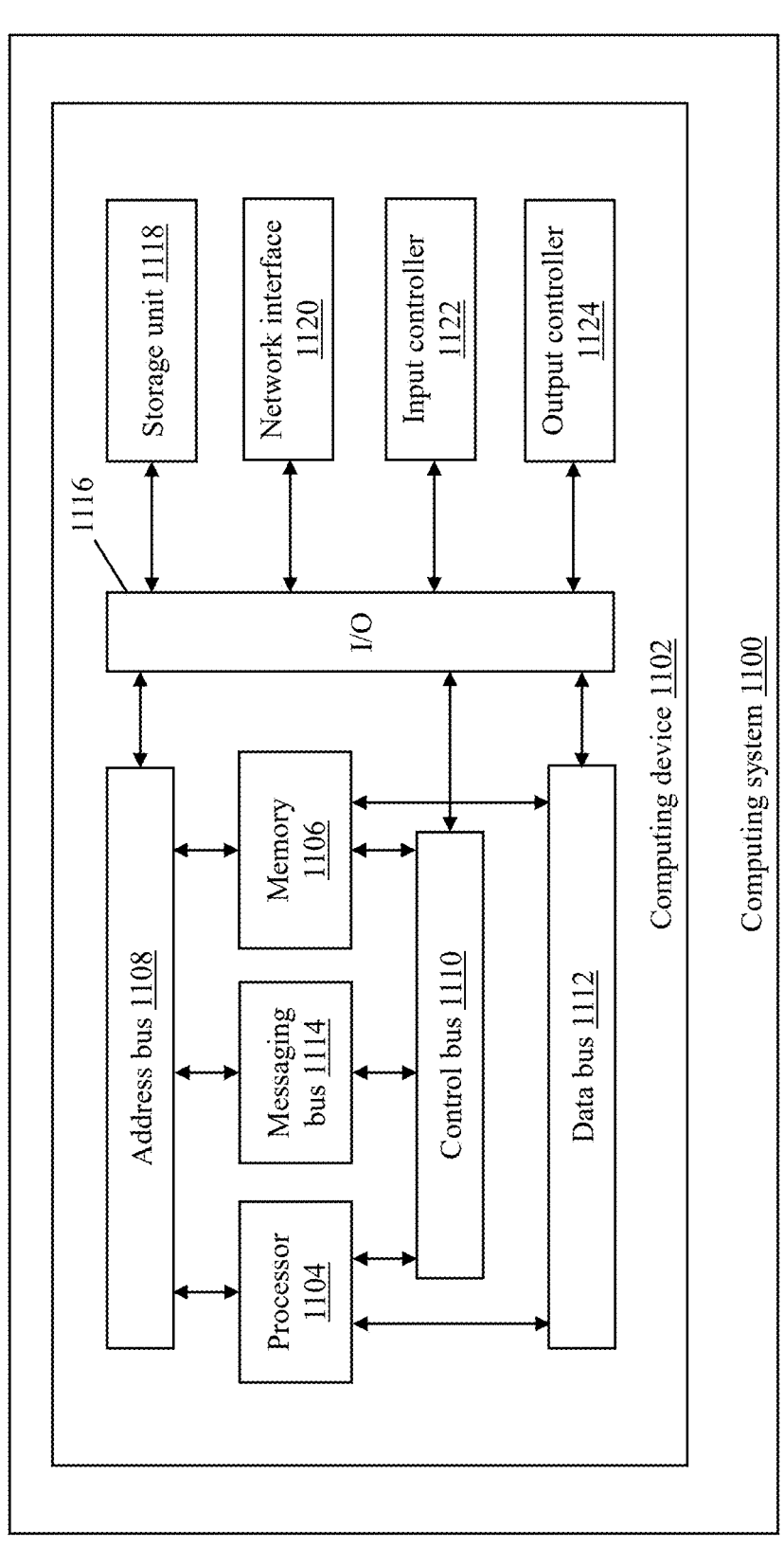
FIG. 11 shows an example computing system for carrying out methods of the present disclosure, consistent with disclosed embodiments of the present disclosure.

FIG. 11 shows an example computing system 1100 for carrying out the methods of the present disclosure, consistent with disclosed embodiments of the present disclosure. Specifically, FIG. 11 shows a block diagram of an embodiment of the computing system 1100 according to example embodiments of the present disclosure.

The computing system 1100 may be configured to perform any of the operations disclosed herein, such as, for example, any of the operations discussed with reference to the functional modules described in relation to FIG. 2. The computing system 1100 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1100 is a distributed system configured to function using multiple computing machines interconnected via a data network or bus system.

The computing system 1100 includes computing devices (such as a computing device 1102). The computing device 1102 includes one or more processors (such as a processor 1104) and a memory 1106. The processor 1104 may be any general-purpose processor(s) configured to execute a set of instructions. For example, the processor 1104 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1104 may be multiple processing units, a single processing core, multiple processing cores, special purpose processing cores, co-processors, or any combination thereof. The processor 1104 may be communicatively coupled to the memory 1106 via an address bus 1108, a control bus 1110, a data bus 1112, and a messaging bus 1111.

The memory 1106 may include non-volatile memories such as a read-only memory (ROM), a programable read-only memory (PROM), an erasable programmable read-only memory (EPROM), a flash memory, or any other device capable of storing program instructions or data with or without applied power. The memory 1106 may also include volatile memories, such as a random-access memory (RAM), a static random-access memory (SRAM), a dynamic random-access memory (DRAM), and a synchronous dynamic random-access memory (SDRAM). The memory 1106 may include single or multiple memory modules. While the memory 1106 is depicted as part of the computing device 1102, a person skilled in the art will recognize that the memory 1106 can be separate from the computing device 1102.

The memory 1106 may store information that can be accessed by the processor 1104. For instance, the memory 1106 (e.g., one or more non-transitory computer-readable storage mediums, memory devices) may include computer-readable instructions (not shown) that can be executed by the processor 1104. The computer-readable instructions may be software written in any suitable programming language or may be implemented in hardware. Additionally, or alternatively, the computer-readable instructions may be executed in logically and/or virtually separate threads on the processor 1104. For example, the memory 1106 may store instructions (not shown) that when executed by the processor 1104 cause the processor 1104 to perform operations such as any of the operations and functions for which the computing system 1100 is configured, as described herein. Additionally, or alternatively, the memory 1106 may store data (not shown) that can be obtained, received, accessed, written, manipulated, created, and/or stored. The data can include, for instance, the data and/or information described herein in relation to FIGS. 1-9. In some implementations, the computing device 1102 may obtain from and/or store data in one or more memory device(s) that are remote from the computing system 1100.

The computing device 1102 may further include an input/output (I/O) interface 1116 communicatively coupled to the address bus 1108, the control bus 1110, and the data bus 1112. The data bus 1112 and messaging bus 1114 may include a plurality of tunnels that may support parallel execution of messages by the overlay system 202. The I/O interface 1116 is configured to couple to one or more external devices (e.g., to receive and send data from/to one or more external devices). Such external devices, along with the various internal devices, may also be known as peripheral devices. The I/O interface 1116 may include both electrical and physical connections for operably coupling the various peripheral devices to the computing device 1102. The I/O interface 1116 may be configured to communicate data, addresses, and control signals between the peripheral devices and the computing device 1102. The I/O interface 1116 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, Fire Wire, various video buses, or the like. The I/O interface 1116 is configured to implement only one interface or bus technology. Alternatively, the I/O interface 1116 is configured to implement multiple interfaces or bus technologies. The I/O interface 1116 may include one or more buffers for buffering transmissions between one or more external devices, internal devices, the computing device 1102, or the processor 1104. The I/O interface 1116 may couple the computing device 1102 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1116 may couple the computing device 1102 to various output devices, including video displays, speakers, printers, projectors, tactile feedback devices, automation control, robotic components, actuators, motors, fans, solenoids, valves, pumps, transmitters, signal emitters, lights, and so forth.

The computing system 1100 may further include a storage unit 1118, a network interface 1120, an input controller 1122, and an output controller 1124. The storage unit 1118, the network interface 1120, the input controller 1122, and the output controller 1124 are communicatively coupled to the central control unit (e.g., the memory 1106, the address bus 1108, the control bus 1110, and the data bus 1112) via the I/O interface 1116. The network interface 1120 communicatively couples the computing system 1100 to one or more networks such as wide area networks (WAN), local area networks (LAN), intranets, the Internet, wireless access networks, wired networks, mobile networks, telephone networks, optical networks, or combinations thereof. The network interface 1120 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1118 is a computer-readable medium, preferably a non-transitory computer-readable medium, comprising one or more programs, the one or more programs comprising instructions which when executed by the processor 1104 cause the computing system 1100 to perform the method steps of the present disclosure. Alternatively, the storage unit 1118 is a transitory computer-readable medium. The storage unit 1118 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1118 stores one or more operating systems, application programs, program modules, data, or any other information. The storage unit 1118 is part of the computing device 1102. Alternatively, the storage unit 1118 is part of one or more other computing machines that are in communication with the computing device 1102, such as servers, database servers, cloud storage, network attached storage, and so forth.

The input controller 1122 may include suitable logic, circuitry, interfaces, and/or code, executable by the circuitry, that may be configured to control one or more input devices that may be configured to receive an input (the stimulus 230) for the overlay system 202. The output controller 1124 may include suitable logic, circuitry, interfaces, and/or code, executable by the circuitry, that may be configured to control one or more output devices that may be configured to render/output the outcome of the operation executed to process the received input (the stimulus 230).

Figure 12:
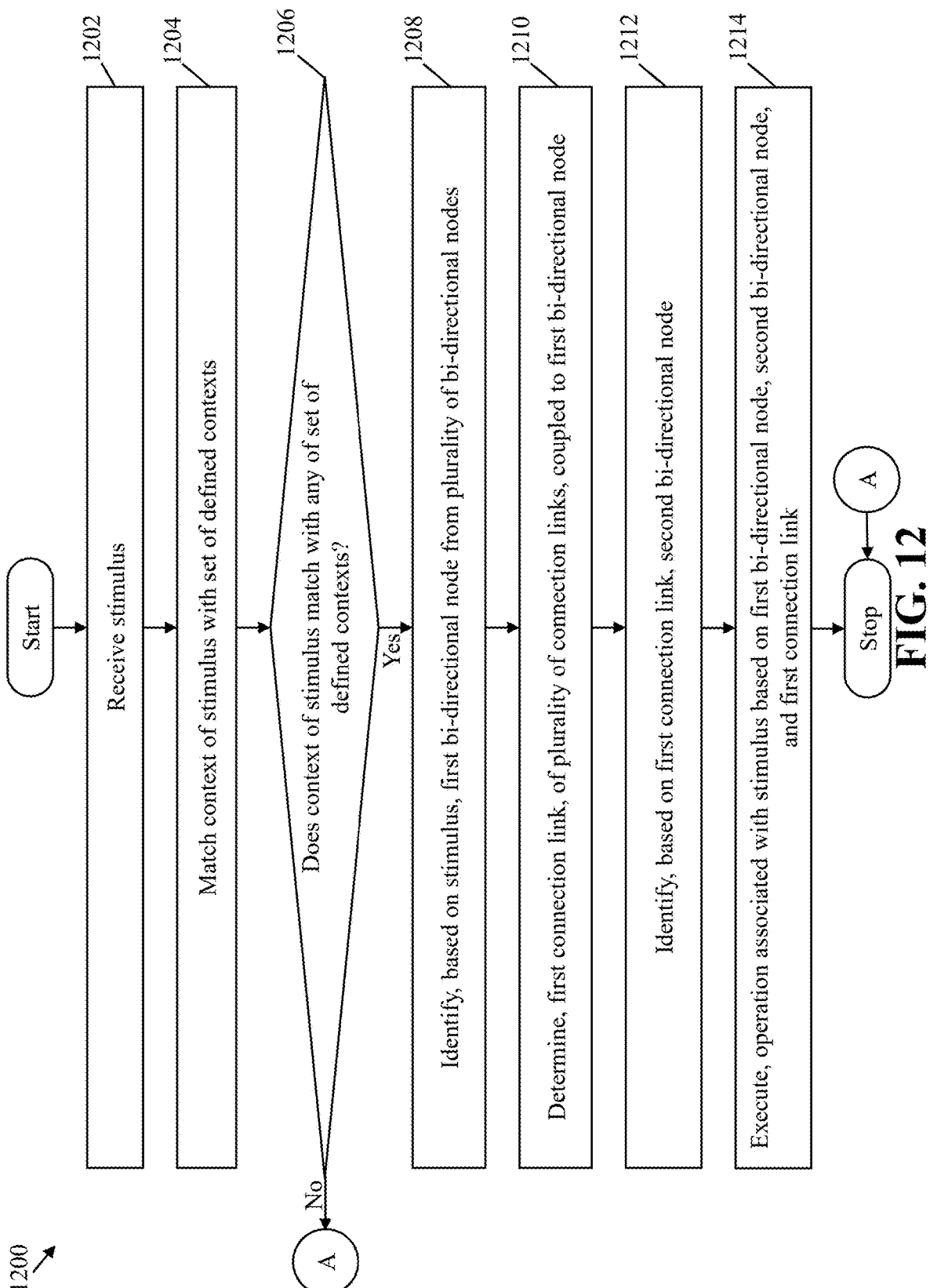
FIG. 12 illustrates a flowchart of a method for processing a stimulus using a bi-directional node, consistent with disclosed embodiments of the present disclosure.

FIG. 12 illustrates a flowchart 1200 of a method for processing a stimulus using a bi-directional node (for example, the executable bi-directional node 602), consistent with disclosed embodiments of the present disclosure. Referring to FIG. 12, at 1202, a stimulus is received. The processing logic (such as the controller module 206 and the stimuli management module 212) receives the stimulus associated with the overlay system 202. The stimulus is indicative of an operation to be performed using a first bi-directional node. At 1204, the context of the stimulus is matched with the set of defined contexts. The processing logic (such as the controller module 206 and the stimuli management module 212) may match the context of the stimulus with the set of defined contexts. At 1206, it is determined whether a context of the stimulus matches any defined context of the set of defined contexts. The processing logic (such as the context module 210) may determine whether the context of the stimulus matches with any defined context of the set of defined contexts. In an instance, when it is determined that the context of the stimulus does not match with any of the set of defined contexts, the method terminates. In another instance, when it is determined that the context of the stimulus matches with one or more contexts of the set of defined contexts, 1208 is executed.

At 1208, a first bi-directional node is identified from the plurality of bi-directional nodes of the executable graph-based model 100 based on the context of the stimulus. The processing logic (such as the controller module 206, the context module 210, and the stimuli management module 212) may identify the first bi-directional node from the plurality of bi-directional nodes.

At 1210, a first connection link, of the plurality of connection links, that may be coupled to the first bi-directional node is determined. The first connection link includes an OCO defining association with the first bi-directional node and an ICO defining association with a second bi-directional node of the plurality of bi-directional nodes. The processing logic (such as the controller module 206, the context module 210, and the stimuli management module 212) may determine the first connection link while loading the first bi-directional node in the executable graph-based model 100. The processing circuitry (for example, the controller module 206 and the transaction module 208) may determine the first connection link based on an identifier of the second bi-directional node being stored along with the first bi-directional node.

At 1212, the second bi-directional node may be identified based on the first connection link. The processing circuitry (for example, the controller module 206 and the transaction module 208) may identify the second bi-directional node while loading the first bi-directional node in the executable graph-based model 100. The processing circuitry (for example, the controller module 206 and the transaction module 208) may identify the second bi-directional node based on an identifier of the second bi-directional node being stored along with the first bi-directional node.

At 1214, an operation associated with the stimulus is executed based on the first bi-directional node, the first connection link, and the second bi-directional node. The processing logic (such as the controller module 206, the context module 210, and the stimuli management module 212) may execute the operation associated with the stimulus based on the first bi-directional node, the first connection link, and the second bi-directional node. FIG. 13 describes the execution of the operation associated with the stimulus in detail.

FIG. 13 illustrates a flowchart 1300 of a method for execution of the operation associated with the stimulus, consistent with disclosed embodiments of the present disclosure. Referring to FIG. 13, at 1302, the first bi-directional node may receive an instruction to execute the operation associated with the stimulus. The processing logic (such as the controller module 206, the context module 210, and the stimuli management module 212) may receive, using the first bi-directional node, the instruction to execute the operation associated with the stimulus. At 1304, one or more generic overlay nodes and/or one or more bi-directional overlay nodes associated with the first bi-directional node may be executed to generate a first intermediate message. The processing logic (such as the controller module 206, the context module 210, and the stimuli management module 212) may execute the one or more generic overlay nodes and/or the one or more bi-directional overlay nodes associated with the first bi-directional node to generate the first intermediate message.

At 1306, one or more generic overlay nodes and/or one or more bi-directional overlay nodes associated with an outward group object associated with the first bi-directional node may be executed on the first intermediate message to generate a second intermediate message. The processing logic (such as the controller module 206, the context module 210, and the stimuli management module 212) may execute the one or more generic overlay nodes and/or the one or more bi-directional overlay nodes associated with the outward group object to generate the second intermediate message.

At 1308, one or more generic overlay nodes and/or one or more bi-directional overlay nodes associated with the OCO associated with the first bi-directional node may be executed on the second intermediate message to generate a third intermediate message. The processing logic (such as the controller module 206, the context module 210, and the stimuli management module 212) may execute the one or more generic overlay nodes and/or the one or more bi-directional overlay nodes associated with the OCO to generate the third intermediate message.

At 1310, one or more generic overlay nodes and/or one or more bi-directional overlay nodes associated with the ICO associated with the second bi-directional node may be executed on the third intermediate message to generate a fourth intermediate message. The processing logic (such as the controller module 206, the context module 210, and the stimuli management module 212) may execute the one or more generic overlay nodes and/or the one or more bi-directional overlay nodes associated with the ICO to generate the fourth intermediate message.

At 1312, one or more generic overlay nodes and/or one or more bi-directional overlay nodes associated with an inward group object associated with the second bi-directional node may be executed on the fourth intermediate message to generate a fifth intermediate message. The processing logic (such as the controller module 206, the context module 210, and the stimuli management module 212) may execute the one or more generic overlay nodes and/or the one or more bi-directional overlay nodes associated with the inward group object to generate the fifth intermediate message.

At 1314, one or more generic overlay nodes and/or one or more bi-directional overlay nodes associated with the second bi-directional node may be executed on the fifth intermediate message to generate a stimulus response for the stimulus. The processing logic (such as the controller module 206, the context module 210, and the stimuli management module 212) may execute the one or more generic overlay nodes and/or the one or more bi-directional overlay nodes associated with the second bi-directional node to generate the stimulus response for the stimulus.

The disclosed embodiments encompass numerous advantages including a simple and user-friendly implementation of the executable graph-based model 100 that may be in turn used to implement various complex and advanced applications. Further, the disclosed systems and methods allow for the facilitation of bi-directional nodes in the executable graph-based model 100. Notably, the present disclosure facilitates a plurality of bi-directional nodes in an executable graph-based model. A first bi-directional node is associated with a second bi-directional node by way of a connection link that includes a primary role for the first bi-directional node and a secondary role for the second bi-directional node. The primary role and the secondary role indicate a capacity in which the first and second bi-directional nodes are mutually associated. To ensure optimal use of resources, the first and second bi-directional nodes are unloaded from the executable graph-based model and stored in a storage element associated with the executable graph-based model 100.

Subsequently, in an instance when the first bi-directional node may be required to be used, the first bi-directional node is loaded. The use of the first bi-directional node also requires the use of other bi-directional nodes associated with the first bi-directional node. Notably, the first bi-directional node is stored with an identifier of the second bi-directional node. This allows for an identification of the association between the first and second bi-directional nodes. Based on the identification the second bi-directional node is loaded. This allows for a quick identification of bi-directional nodes associated with the first bi-directional node by way of dependency, inheritance, role, or the like. Such identification eliminates the requirement of executing multiple look-up operations for identifying the bi-directional nodes associated with the first bi-directional node. Hence, the bi-directional nodes may be loaded in significantly less time and thus increase throughput and decrease latency associated with operations performed in the overlay system 202. In a real-life scenario, when each bi-directional node in the executable graph-based model 100 is associated with multiple other bi-directional nodes, such an approach of identification of association among bi-directional nodes and loading of the bi-directional nodes allows for a seamless and simplified approach for implementing solutions associated with various domains. Application areas of the systems and methods disclosed herein are fintech platforms, social media platforms, gaming platforms, research and analytics platforms, robotics, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating a plurality of bi-directional nodes in the executable graph-based model. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
  a storage element configured to store an executable graph-based model that includes a plurality of bi-directional nodes and a plurality of connection links, and processing circuitry that is coupled to the storage element, and configured to:
    receive a stimulus;
    identify, based on the stimulus, a first bi-directional node from the plurality of bi-directional nodes;
    determine a first connection link, of the plurality of connection links, coupled to the first bi-directional node, the first connection link including a first outward connection object defining association with the first bi-directional node and a first inward connection object defining association with a second bi-directional node of the plurality of bi-directional nodes;
    identify, based on the first connection link, the second bi-directional node; and
    execute an operation associated with the stimulus based on at least one of the first bi-directional node, the second bi-directional node, or the first connection link.

2. The overlay system of 1,
  wherein the first outward connection object and the first inward connection object have a primary role and a secondary role, respectively,
  wherein the primary role and the secondary role, collectively, indicate a capacity in which the first bi-directional node and the second bi-directional node are mutually associated, and
  wherein the operation associated with the stimulus is executed in conformity with the primary role and the secondary role.

3. The overlay system of 2, wherein the primary role and the secondary role are complementary.

4. The overlay system of 1,
  wherein the executable graph-based model further includes a plurality of bi-directional overlay nodes,
  wherein the processing circuitry is further configured to identify a first set of bi-directional overlay nodes, of the plurality of bi-directional nodes, that is associated with the first bi-directional node,
  wherein the first set of bi-directional overlay nodes is configured to extend functionality of the first bi-directional node, and
  wherein the operation associated with the stimulus is executed further based on the first set of bi-directional overlay nodes.

5. The overlay system of 4,
  wherein the executable graph-based model further includes a plurality of generic overlay nodes,
  wherein the processing circuitry is further configured to identify a first set of generic overlay nodes, of the plurality of generic overlay nodes, that is associated with the first bi-directional node,
  wherein the first set of generic overlay nodes is configured to extend functionality of the first bi-directional node,
  wherein the first bi-directional node includes an overlay manager that is configured to:
    maintain a ledger of functionalities of the first set of generic overlay nodes and the first set of bi-directional overlay nodes; and
    trigger, based on the stimulus, at least one of a group consisting of (i) one or more generic overlay nodes of the first set of generic overlay nodes or (ii) one or more bi-directional overlay nodes of the first set of bi-directional overlay nodes, and
  wherein the operation associated with the stimulus is executed further based on the one or more generic overlay nodes and the one or more bi-directional overlay nodes.

6. The overlay system of 4, wherein the first set of bi-directional overlay nodes is associated with the first bi-directional node by way of one of a group consisting of a direct association and a second connection link of the plurality of connection links.

7. The overlay system of 4, wherein a bi-directional overlay node, of the first set of bi-directional overlay nodes, is one of a group consisting of a stateless node and a stateful node.

8. The overlay system of 1,
  wherein the executable graph-based model further includes a plurality of bi-directional overlay nodes,
  wherein the processing circuitry is further configured to identify a second set of bi-directional overlay nodes, of the plurality of bi-directional overlay nodes, that is associated with the second bi-directional node,
  wherein the second set of bi-directional overlay nodes is configured to extend functionality of the second bi-directional node, and
  wherein the operation associated with the stimulus is executed further based on the second set of bi-directional overlay nodes.

9. The overlay system of 1,
  wherein the executable graph-based model further includes a plurality of bi-directional overlay nodes,
  wherein the processing circuitry is further configured to identify a third set of bi-directional overlay nodes, of the plurality of bi-directional overlay nodes, that is associated with the first outward connection object,
  wherein the third set of bi-directional overlay nodes is configured to extend functionality of the first outward connection object, and
  wherein the operation associated with the stimulus is executed further based on the third set of bi-directional overlay nodes.

10. The overlay system of 1,
  wherein the executable graph-based model further includes a plurality of bi-directional overlay nodes,
  wherein the processing circuitry is further configured to identify a fourth set of bi-directional overlay nodes, of the plurality of bi-directional overlay nodes, that is associated with the first inward connection object,
  wherein the fourth set of bi-directional overlay nodes is configured to extend functionality of the first inward connection object, and wherein the operation associated with the stimulus is executed further based on the fourth set of bi-directional overlay nodes.

11. The overlay system of 1, wherein a node-type of a bi-directional node of the plurality of bi-directional nodes is an edge node-type.

12. The overlay system of 1,
   wherein the processing circuitry is further configured to (i) determine a third connection link, of the plurality of connection links, coupled to the first bi-directional node, the third connection link including a second outward connection object defining association with the first bi-directional node and a second inward connection object defining association with a third bi-directional node of the plurality of bi-directional nodes, and (ii) identify, based on the third connection link, the third bi-directional node,
   wherein the first outward connection object and the second outward connection object constitute an outward group object associated with the first bi-directional node, and
   wherein the operation associated with the stimulus is executed further based on the outward group object, the third bi-directional node, and the third connection link.

13. The overlay system of 12, wherein the operation associated with the stimulus is executed further based on the first bi-directional node communicating with the second bi-directional node and the third bi-directional node by way of the outward group object.

14. The overlay system of 12,
   wherein the executable graph-based model further includes a plurality of bi-directional overlay nodes,
   wherein the processing circuitry is further configured to identify a fifth set of bi-directional overlay nodes, of the plurality of bi-directional overlay nodes, that is associated with the outward group object,
   wherein the fifth set of bi-directional overlay nodes is configured to extend functionality of the outward group object, and
   wherein the operation associated with the stimulus is executed further based on the fifth set of bi-directional overlay nodes.

15. The overlay system of 12,
   wherein the executable graph-based model further includes a plurality of generic overlay nodes,
   wherein the processing circuitry is further configured to identify a second set of generic overlay nodes, of the plurality of generic overlay nodes, that is associated with the outward group object,
   wherein the second set of generic overlay nodes is configured to extend functionality of the outward group object, and
   wherein the operation associated with the stimulus is executed further based on the second set of generic overlay nodes.

16. The overlay system of 1,
   wherein the processing circuitry is further configured to (i) determine a fourth connection link, of the plurality of connection links, coupled to the first bi-directional node, the fourth connection link including a third inward connection object defining association with the first bi-directional node and a third outward connection object defining association with a fourth bi-directional node of the plurality of bi-directional nodes, and (ii) identify, based on the fourth connection link, the fourth bi-directional node, wherein the processing circuitry is further configured to (i) determine a fifth connection link, of the plurality of connection links, coupled to the first bi-directional node, the fifth connection link including a fourth inward connection object defining association with the first bi-directional node and a fourth outward connection object defining association with a fifth bi-directional node of the plurality of bi-directional nodes, and (ii) identify, based on the fifth connection link, the fifth bi-directional node,
   wherein the third inward connection object and the fourth inward connection object constitute an inward group object associated with the first bi-directional node, and
   wherein the operation associated with the stimulus is executed further based on the inward group object, the fourth bi-directional node, the fifth bi-directional node, the fourth connection link, and the fifth connection link.

17. The overlay system of 16, wherein the operation associated with the stimulus is executed further based on the first bi-directional node communicating with the fourth bi-directional node and the fifth bi-directional node by way of the inward group object.

18. The overlay system of 16,
   wherein the executable graph-based model further includes a plurality of bi-directional overlay nodes,
   wherein the processing circuitry is further configured to identify a sixth set of bi-directional overlay nodes, of the plurality of bi-directional overlay nodes, that is associated with the inward group object,
   wherein the sixth set of bi-directional overlay nodes is configured to extend functionality of the inward group object, and
   wherein the operation associated with the stimulus is executed further based on the sixth set of bi-directional overlay nodes.

19. The overlay system of 16,
   wherein the executable graph-based model further includes a plurality of generic overlay nodes,
   wherein the processing circuitry is further configured to identify a third set of generic overlay nodes, of the plurality of generic overlay nodes, that is associated with the inward group object,
   wherein the third set of generic overlay nodes is configured to extend functionality of the inward group object, and
   wherein the operation associated with the stimulus is executed further based on the third set of generic overlay nodes.

20. The overlay system of 1, wherein the first connection link is a bi-directional node with a role node-type.

21. The overlay system of 1,
   wherein the first connection link is indicative of a dependency between the first bi-directional node and the second bi-directional node, and
   wherein the dependency between the first bi-directional node and the second bi-directional node is one of a group consisting of: an own-owned dependency, a use-used dependency, or a share-shared dependency.

22. The overlay system of 21, wherein based on the dependency being the own-owned dependency, the first bi-directional node owns the second bi-directional node.

23. The overlay system of 21, wherein based on the dependency being the share-shared dependency, the first bi-directional node shares the second bi-directional node with one or more bi-directional nodes of the plurality of bi-directional nodes.

24. The overlay system of 21, wherein based on the dependency being the use-used dependency, the first bi-directional node uses the second bi-directional node based on an absence of simultaneous use of the second bi-directional node by one or more other bi-directional nodes of the plurality of bi-directional nodes.

25. The overlay system of 1, wherein at least one of the first inward connection object and the first outward connection object is associated with a set of attributes pertaining to a loading strategy associated with at least one of the group consisting of the first bi-directional node or the second bi-directional node.

26. The overlay system of 1, wherein prior to the execution of the operation associated with the stimulus, the processing circuitry is further configured to load, in the executable graph-based model, at least one of a group consisting of: the first bi-directional node, the second bi-directional node, or the first connection link.

27. The overlay system of 26, wherein prior to the execution of the operation associated with the stimulus, the processing circuitry is further configured to load, in the executable graph-based model, one or more sets of bi-directional overlay nodes that are associated with at least one of a group consisting of: the first bi-directional node, the second bi-directional node, the first inward connection object, or the first outward connection object.

28. The overlay system of 26, wherein prior to the execution of the operation associated with the stimulus, the processing circuitry is further configured to load, in the executable graph-based model, one or more sets of generic overlay nodes that are associated with at least one of a group consisting of: the first bi-directional node, the second bi-directional node, the first inward connection object, or the first outward connection object.

29. The overlay system of 26, wherein based on the loading of the first bi-directional node, the processing circuitry is further configured to load at least one of a group consisting of (i) one or more bi-directional nodes of the plurality of bi-directional nodes and (ii) one or more generic nodes of the executable graph-based model, with which the first bi-directional node has a dependency, and wherein the dependency is one of a group consisting of: an own-owned dependency, a share-shared dependency, and a use-used dependency.

30. The overlay system of 26, wherein the first bi-directional node is further configured to inherit at least one of a group consisting of (i) a sixth bi-directional node of the plurality of bi-directional nodes or (ii) one or more generic nodes of the executable graph-based model, and wherein based on the loading of the first bi-directional node, the processing circuitry is further configured to load at least one of the group consisting of (i) the sixth bi-directional node or (ii) the one or more generic nodes.

31. The overlay system of 1, wherein upon the execution of the operation associated with the stimulus, the processing circuitry is further configured to unload at least one of a group consisting of: the first bi-directional node, the second bi-directional node, or the first connection link, from the executable graph-based model.

32. The overlay system of 31, wherein based on the unloading of the first bi-directional node, the processing circuitry is further configured to unload at least one of a group consisting of (i) one or more bi-directional nodes of the plurality of bi-directional nodes or (ii) one or more generic nodes of the executable graph-based model, with which the first bi-directional node has a dependency, and wherein the dependency is one of a group consisting of: an own-owned dependency, a share-shared dependency, or a use-used dependency.

33. The overlay system of 31, wherein the first set of bi-directional nodes is further configured to inherit at least one of a group consisting of (i) a seventh bi-directional node of the plurality of bi-directional nodes or (ii) one or more generic nodes of the executable graph-based model, and wherein based on the unloading of the first bi-directional overlay node, the processing circuitry is further configured to unload at least one of the group consisting of (i) the seventh bi-directional node or (ii) the one or more generic nodes.

34. The overlay system of 1, wherein the executable graph-based model further includes a plurality of generic nodes, wherein a node-type of each generic node of the plurality of generic nodes is one of a group consisting of: a vertex node-type, an edge node-type, a role node-type, or an overlay node-type, wherein the processing circuitry is further configured to identify a first generic node of the plurality of generic nodes that is associated with the first bi-directional node, wherein the first bi-directional node is associated with the first generic node by way of a first generic role that indicates a capacity in which the first bi-directional node is associated with the first generic node, and wherein the operation associated with the stimulus is executed further based on the first generic node and the first generic role.

35. The overlay system of 1, wherein the processing circuitry is further configured to (i) determine a sixth connection link, of the plurality of connection links, coupled to the second bi-directional node, the sixth connection link including the first inward connection object defining association with the second bi-directional node and a fifth outward connection object defining association with an eighth bi-directional node of the plurality of bi-directional nodes, and (ii) identify, based on the sixth connection link, the eighth bi-directional node, and wherein the operation associated with the stimulus is executed further based on the eighth bi-directional node and the sixth connection link.

36. A method, comprising:

receiving, by processing circuitry of an overlay system, a stimulus, wherein an executable graph-based model is stored in a storage element of the overlay system, and wherein the executable graph-based model includes a plurality of bi-directional nodes and a plurality of connection links, identifying, by the processing circuitry, based on the stimulus, a first bi-directional node from the plurality of bi-directional nodes;

determining, by the processing circuitry, a first connection link, of the plurality of connection links, coupled to the first bi-directional node, the first connection link including a first outward connection object defining association with the first bi-directional node and a first inward connection object defining association with a second bi-directional node of the plurality of bi-directional nodes;

identifying, by the processing circuitry, based on the first connection link, the second bi-directional node; and executing, by the processing circuitry, an operation associated with the stimulus based on at least one of the first bi-directional node, the second bi-directional node, or the first connection link.

What is claimed is:

1. An overlay system, comprising:

a storage element configured to store an executable graph-based model that includes a plurality of bi-directional nodes and a plurality of connection links, and processing circuitry that is coupled to the storage element, and configured to:

receive a stimulus;

identify, based on the stimulus, a first bi-directional node from the plurality of bi-directional nodes;

determine a first connection link, of the plurality of connection links, coupled to the first bi-directional node, the first connection link including a first outward connection object defining association with the first bi-directional node and a first inward connection object defining association with a second bi-directional node of the plurality of bi-directional nodes;

identify, based on the first connection link, the second bi-directional node; and execute an operation associated with the stimulus based on at least one of the first bi-directional node, the second bi-directional node, or the first connection link.

2. The overlay system of claim 1, wherein the first outward connection object and the first inward connection object have a primary role and a secondary role, respectively, wherein the primary role and the secondary role, collectively, indicate a capacity in which the first bi-directional node and the second bi-directional node are mutually associated, and wherein the operation associated with the stimulus is executed in conformity with the primary role and the secondary role.

3. The overlay system of claim 1, wherein the executable graph-based model further includes a plurality of bi-directional overlay nodes, wherein the processing circuitry is further configured to identify a first set of bi-directional overlay nodes, of the plurality of bi-directional nodes, that is associated with the first bi-directional node, wherein the first set of bi-directional overlay nodes is configured to extend functionality of the first bi-directional node, and wherein the operation associated with the stimulus is executed further based on the first set of bi-directional overlay nodes.

4. The overlay system of claim 3, wherein the executable graph-based model further includes a plurality of generic overlay nodes, wherein the processing circuitry is further configured to identify a first set of generic overlay nodes, of the plurality of generic overlay nodes, that is associated with the first bi-directional node, wherein the first set of generic overlay nodes is configured to extend the functionality of the first bi-directional node, wherein the first bi-directional node includes an overlay manager that is configured to:

maintain a ledger of functionalities of the first set of generic overlay nodes and the first set of bi-directional overlay nodes; and trigger, based on the stimulus, at least one of a group consisting of (i) one or more generic overlay nodes of the first set of generic overlay nodes or (ii) one or more bi-directional overlay nodes of the first set of bi-directional overlay nodes, and wherein the operation associated with the stimulus is executed further based on the one or more generic overlay nodes and the one or more bi-directional overlay nodes.

5. The overlay system of claim 3, wherein the first set of bi-directional overlay nodes is associated with the first bi-directional node by way of one of a group consisting of a direct association and a second connection link of the plurality of connection links.

6. The overlay system of claim 1, wherein the executable graph-based model further includes a plurality of bi-directional overlay nodes, wherein the processing circuitry is further configured to identify a second set of bi-directional overlay nodes, of the plurality of bi-directional overlay nodes, that is associated with the second bi-directional node, wherein the second set of bi-directional overlay nodes is configured to extend functionality of the second bi-directional node, and wherein the operation associated with the stimulus is executed further based on the second set of bi-directional overlay nodes.

7. The overlay system of claim 1, wherein the executable graph-based model further includes a plurality of bi-directional overlay nodes, wherein the processing circuitry is further configured to identify a third set of bi-directional overlay nodes, of the plurality of bi-directional overlay nodes, that is associated with the first outward connection object, wherein the third set of bi-directional overlay nodes is configured to extend functionality of the first outward connection object, and wherein the operation associated with the stimulus is executed further based on the third set of bi-directional overlay nodes.

8. The overlay system of claim 1, wherein the executable graph-based model further includes a plurality of bi-directional overlay nodes, wherein the processing circuitry is further configured to identify a fourth set of bi-directional overlay nodes, of the plurality of bi-directional overlay nodes, that is associated with the first inward connection object, wherein the fourth set of bi-directional overlay nodes is configured to extend functionality of the first inward connection object, and wherein the operation associated with the stimulus is executed further based on the fourth set of bi-directional overlay nodes.

9. The overlay system of claim 1, wherein a node-type of a bi-directional node of the plurality of bi-directional nodes is an edge node-type.

10. The overlay system of claim 1, wherein the processing circuitry is further configured to (i) determine a third connection link, of the plurality of connection links, coupled to the first bi-directional node, the third connection link including a second outward connection object defining association with the first bi-directional node and a second inward connection object defining association with a third bi-directional node of the plurality of bi-directional nodes, and (ii) identify, based on the third connection link, the third bi-directional node, wherein the first outward connection object and the second outward connection object constitute an outward group object associated with the first bi-directional node, and wherein the operation associated with the stimulus is executed further based on the outward group object, the third bi-directional node, and the third connection link.

11. The overlay system of claim 10, wherein the operation associated with the stimulus is executed further based on the first bi-directional node communicating with the second bi-directional node and the third bi-directional node by way of the outward group object.

12. The overlay system of claim 10, wherein the executable graph-based model further includes a plurality of bi-directional overlay nodes, wherein the processing circuitry is further configured to identify a fifth set of bi-directional overlay nodes, of the plurality of bi-directional overlay nodes, that is associated with the outward group object, wherein the fifth set of bi-directional overlay nodes is configured to extend functionality of the outward group object, and wherein the operation associated with the stimulus is executed further based on the fifth set of bi-directional overlay nodes.

13. The overlay system of claim 10, wherein the executable graph-based model further includes a plurality of generic overlay nodes, wherein the processing circuitry is further configured to identify a second set of generic overlay nodes, of the plurality of generic overlay nodes, that is associated with the outward group object, wherein the second set of generic overlay nodes is configured to extend functionality of the outward group object, and wherein the operation associated with the stimulus is executed further based on the second set of generic overlay nodes.

14. The overlay system of claim 1, wherein the processing circuitry is further configured to (i) determine a fourth connection link, of the plurality of connection links, coupled to the first bi-directional node, the fourth connection link including a third inward connection object defining association with the first bi-directional node and a third outward connection object defining association with a fourth bi-directional node of the plurality of bi-directional nodes, and (ii) identify, based on the fourth connection link, the fourth bi-directional node, wherein the processing circuitry is further configured to (i) determine a fifth connection link, of the plurality of connection links, coupled to the first bi-directional node, the fifth connection link including a fourth inward connection object defining association with the first bi-directional node and a fourth outward connection object defining association with a fifth bi-directional node of the plurality of bi-directional nodes, and (ii) identify, based on the fifth connection link, the fifth bi-directional node, wherein the third inward connection object and the fourth inward connection object constitute an inward group object associated with the first bi-directional node, and wherein the operation associated with the stimulus is executed further based on the inward group object, the fourth bi-directional node, the fifth bi-directional node, the fourth connection link, and the fifth connection link.

15. The overlay system of claim 14, wherein the operation associated with the stimulus is executed further based on the first bi-directional node communicating with the fourth bi-directional node and the fifth bi-directional node by way of the inward group object.

16. The overlay system of claim 14, wherein the executable graph-based model further includes a plurality of bi-directional overlay nodes, wherein the processing circuitry is further configured to identify a sixth set of bi-directional overlay nodes, of the plurality of bi-directional overlay nodes, that is associated with the inward group object, wherein the sixth set of bi-directional overlay nodes is configured to extend functionality of the inward group object, and wherein the operation associated with the stimulus is executed further based on the sixth set of bi-directional overlay nodes.

17. The overlay system of claim 1, wherein the first connection link is a bi-directional node with a role node-type.

18. The overlay system of claim 1, wherein the first connection link is indicative of a dependency between the first bi-directional node and the second bi-directional node, and wherein the dependency between the first bi-directional node and the second bi-directional node is one of a group consisting of: an own-owned dependency, a use-used dependency, or a share-shared dependency.

19. The overlay system of claim 1, wherein the processing circuitry is further configured to (i) determine a sixth connection link, of the plurality of connection links, coupled to the second bi-directional node, the sixth connection link including the first inward connection object defining association with the second bi-directional node and a fifth outward connection object defining association with a sixth bi-directional node of the plurality of bi-directional nodes, and (ii) identify, based on the sixth connection link, the sixth bi-directional node, and wherein the operation associated with the stimulus is executed further based on the sixth bi-directional node and the sixth connection link.

20. A method, comprising:

receiving, by processing circuitry of an overlay system, a stimulus, wherein an executable graph-based model is stored in a storage element of the overlay system, and wherein the executable graph-based model includes a plurality of bi-directional nodes and a plurality of connection links, identifying, by the processing circuitry, based on the stimulus, a first bi-directional node from the plurality of bi-directional nodes;

determining, by the processing circuitry, a first connection link, of the plurality of connection links, coupled to the first bi-directional node, the first connection link including a first outward connection object defining association with the first bi-directional node and a first inward connection object defining association with a second bi-directional node of the plurality of bi-directional nodes;

identifying, by the processing circuitry, based on the first connection link, the second bi-directional node; and executing, by the processing circuitry, an operation associated with the stimulus based on at least one of the first bi-directional node, the second bi-directional node, or the first connection link.

* * * * *